United States Patent
Coleman et al.

(10) Patent No.: US 8,272,792 B2
(45) Date of Patent: Sep. 25, 2012

(54) RETENTION BODIES FOR FIBER OPTIC CABLE ASSEMBLIES

(75) Inventors: Casey A. Coleman, Hickory, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/355,907

(22) Filed: Jan. 19, 2009

(65) Prior Publication Data

US 2010/0080516 A1    Apr. 1, 2010

Related U.S. Application Data

(63) Continuation-in-part of application No. 12/241,346, filed on Sep. 30, 2008.

(51) Int. Cl.
*G02B 6/36* (2006.01)
(52) U.S. Cl. .......................... 385/80; 385/139
(58) Field of Classification Search ............. 385/80–83
See application file for complete search history.

(56) References Cited

U.S. PATENT DOCUMENTS

| | | | |
|---|---|---|---|
| 4,291,941 A | 9/1981 | Melzer | 350/96.18 |
| 4,354,731 A | 10/1982 | Mouissie | 350/96.21 |
| 4,432,603 A | 2/1984 | Morency et al. | 350/96.21 |
| 4,553,814 A | 11/1985 | Bahl et al. | 350/96.21 |
| 4,934,785 A | 6/1990 | Mathis et al. | 350/96.21 |
| 4,936,662 A * | 6/1990 | Griffin | 385/77 |
| 5,028,114 A | 7/1991 | Krausse et al. | 385/78 |
| 5,129,023 A | 7/1992 | Anderson et al. | 385/70 |
| 5,210,810 A | 5/1993 | Darden et al. | 385/78 |
| 5,548,677 A | 8/1996 | Kakii et al. | 385/92 |
| 5,604,832 A | 2/1997 | Hall et al. | 385/89 |
| 5,606,635 A | 2/1997 | Haake | 385/53 |
| 5,751,874 A | 5/1998 | Chudoba | 385/72 |
| 5,764,833 A | 6/1998 | Kakii et al. | 385/54 |
| 5,778,122 A | 7/1998 | Giebel | 385/55 |
| 5,887,095 A | 3/1999 | Nagase | 385/58 |
| 5,923,804 A * | 7/1999 | Rosson | 385/81 |
| 5,993,071 A | 11/1999 | Hultermans | 385/70 |
| 6,149,313 A | 11/2000 | Giebel et al. | 385/60 |
| 6,151,432 A | 11/2000 | Nakajima et al. | 385/78 |
| 6,224,270 B1 | 5/2001 | Nakajima et al. | 385/78 |
| 6,234,683 B1 | 5/2001 | Waldron et al. | 385/78 |
| 6,234,685 B1 | 5/2001 | Carlisle et al. | 385/83 |
| 6,355,976 B1 | 3/2002 | Faris | 257/686 |
| 6,497,516 B1 | 12/2002 | Toyooka et al. | 385/78 |
| 6,579,014 B2 | 6/2003 | Melton et al. | 385/76 |
| 6,648,520 B2 * | 11/2003 | McDonald et al. | 385/78 |
| 6,910,812 B2 | 6/2005 | Pommer et al. | 385/92 |

(Continued)

FOREIGN PATENT DOCUMENTS

EP    0468671    1/1992

(Continued)

*Primary Examiner* — Eric Wong
(74) *Attorney, Agent, or Firm* — Christopher Paul LeWallen

(57) ABSTRACT

Retention bodies for securing a fiber optic cable thereto for optical connectorization are disclosed along with fiber optic cable assemblies. The fiber optic cable is inserted into a passage of the retention body and secured to the same using a bonding agent and/or a mechanical element. The rear end opening of the passage is configured for inserting and securing an end portion of the fiber optic cable having at least one strength component and a portion of a cable jacket. Additionally, the retention body has a buckling chamber disposed within the retention body passage for accommodating movement of optical fiber.

19 Claims, 22 Drawing Sheets

U.S. PATENT DOCUMENTS

| | | | |
|---|---|---|---|
| 7,048,450 B2 | 5/2006 | Beer et al. | 385/88 |
| 7,090,406 B2 | 8/2006 | Melton et al. | 385/62 |
| 7,090,407 B2 | 8/2006 | Melton et al. | 385/62 |
| 7,104,703 B2 | 9/2006 | Nagasaka et al. | 385/88 |
| 7,111,990 B2 | 9/2006 | Melton et al. | 385/53 |
| 7,113,679 B2 | 9/2006 | Melton et al. | 385/113 |
| 2004/0057672 A1* | 3/2004 | Doss et al. | 385/76 |
| 2004/0223701 A1 | 11/2004 | Tanaka et al. | 385/55 |
| 2005/0069264 A1 | 3/2005 | Luther et al. | 385/59 |
| 2006/0193562 A1 | 8/2006 | Theuerkorn | 385/53 |
| 2006/0204178 A1 | 9/2006 | Theuerkorn et al. | 385/59 |
| 2007/0025665 A1 | 2/2007 | Dean, Jr. et al. | 385/78 |
| 2008/0013891 A1 | 1/2008 | Nishioka et al. | 385/59 |
| 2008/0044137 A1 | 2/2008 | Luther et al. | 385/60 |
| 2008/0175541 A1 | 7/2008 | Lu et al. | 385/62 |
| 2008/0175542 A1 | 7/2008 | Lu et al. | 385/62 |
| 2008/0175546 A1 | 7/2008 | Lu et al. | 385/92 |
| 2008/0226234 A1 | 9/2008 | Droege | 385/60 |
| 2008/0226235 A1 | 9/2008 | Luther et al. | 385/62 |

FOREIGN PATENT DOCUMENTS

| | | |
|---|---|---|
| EP | 0547778 | 6/1993 |
| EP | 0940700 | 9/1999 |
| EP | 0949522 A2 | 10/1999 |
| EP | 0949522 A3 | 10/1999 |
| EP | 1065542 | 1/2001 |
| JP | 8-304675 | 11/1996 |
| WO | WO00/22060 | 4/2000 |
| WO | WO01/27660 | 4/2001 |
| WO | WO2008/021351 A2 | 2/2008 |
| WO | WO2008/021351 A3 | 2/2008 |

* cited by examiner

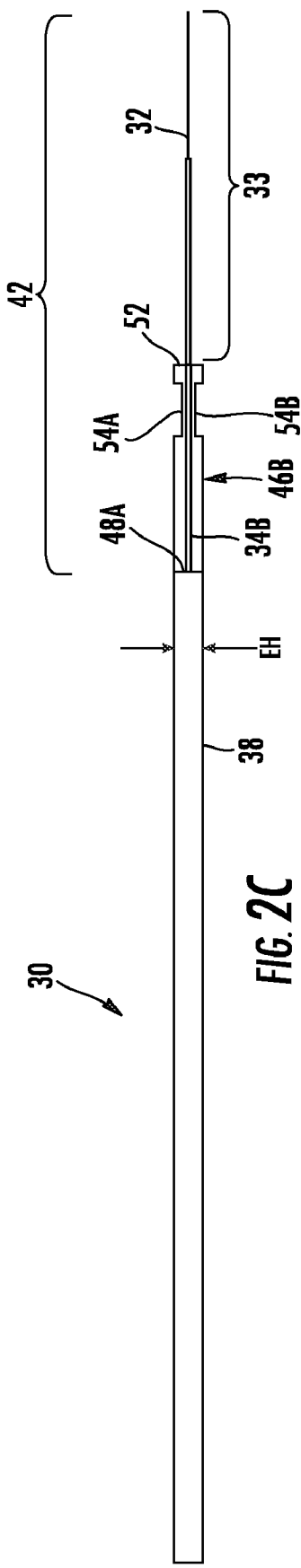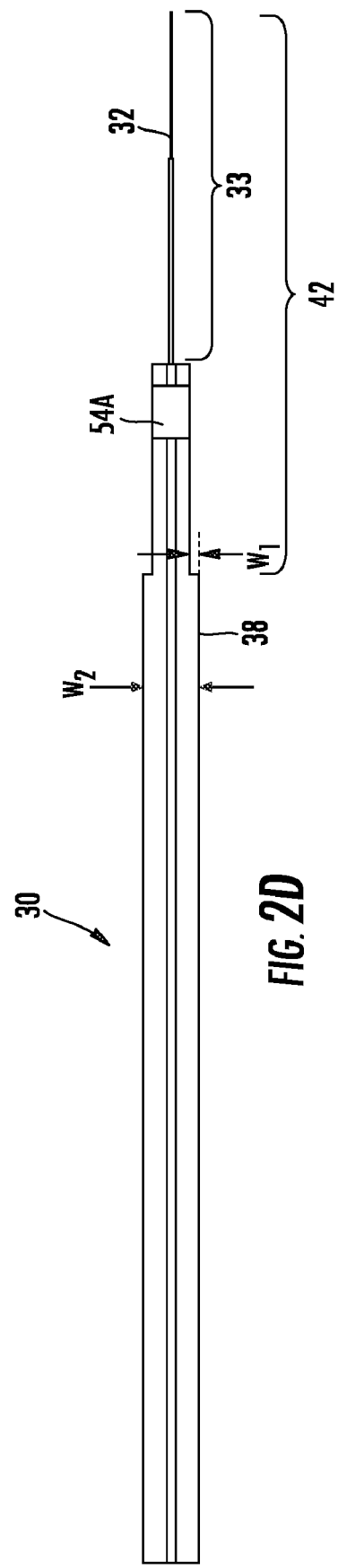

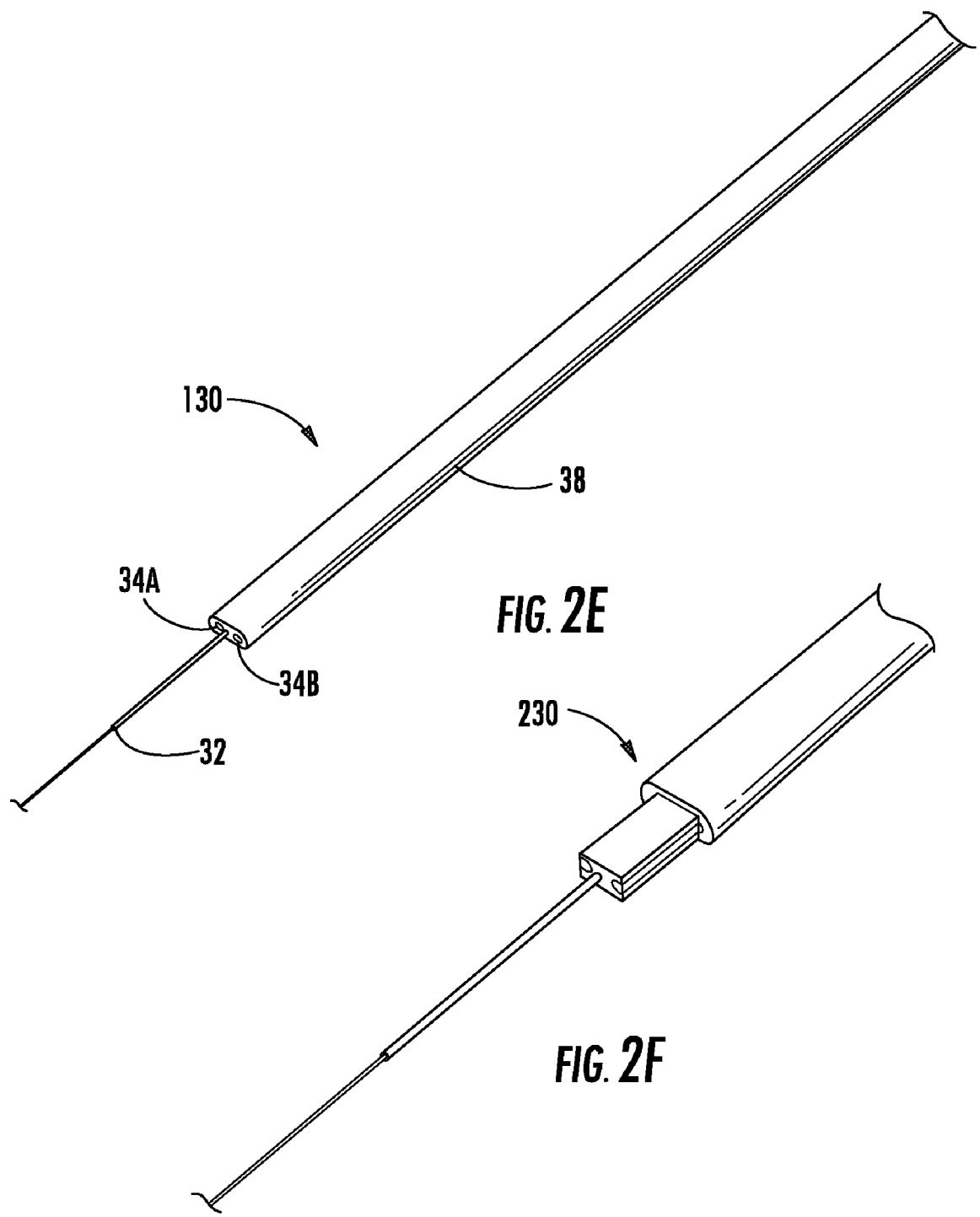

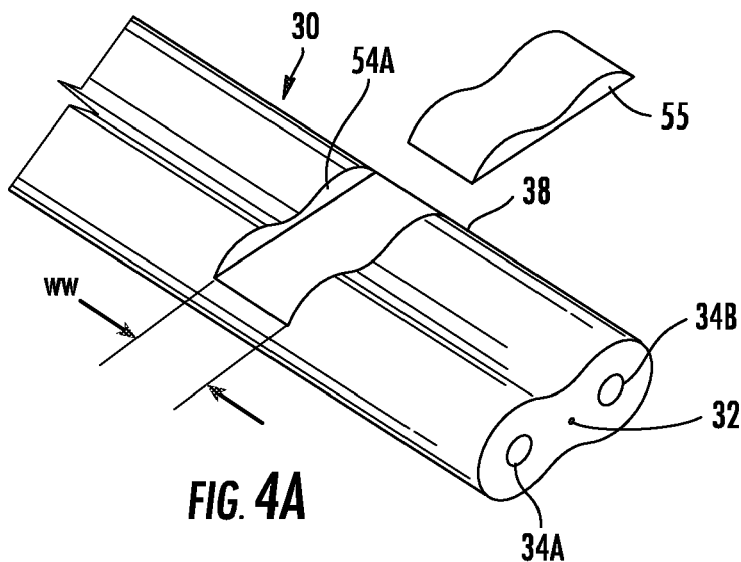
FIG. 4A
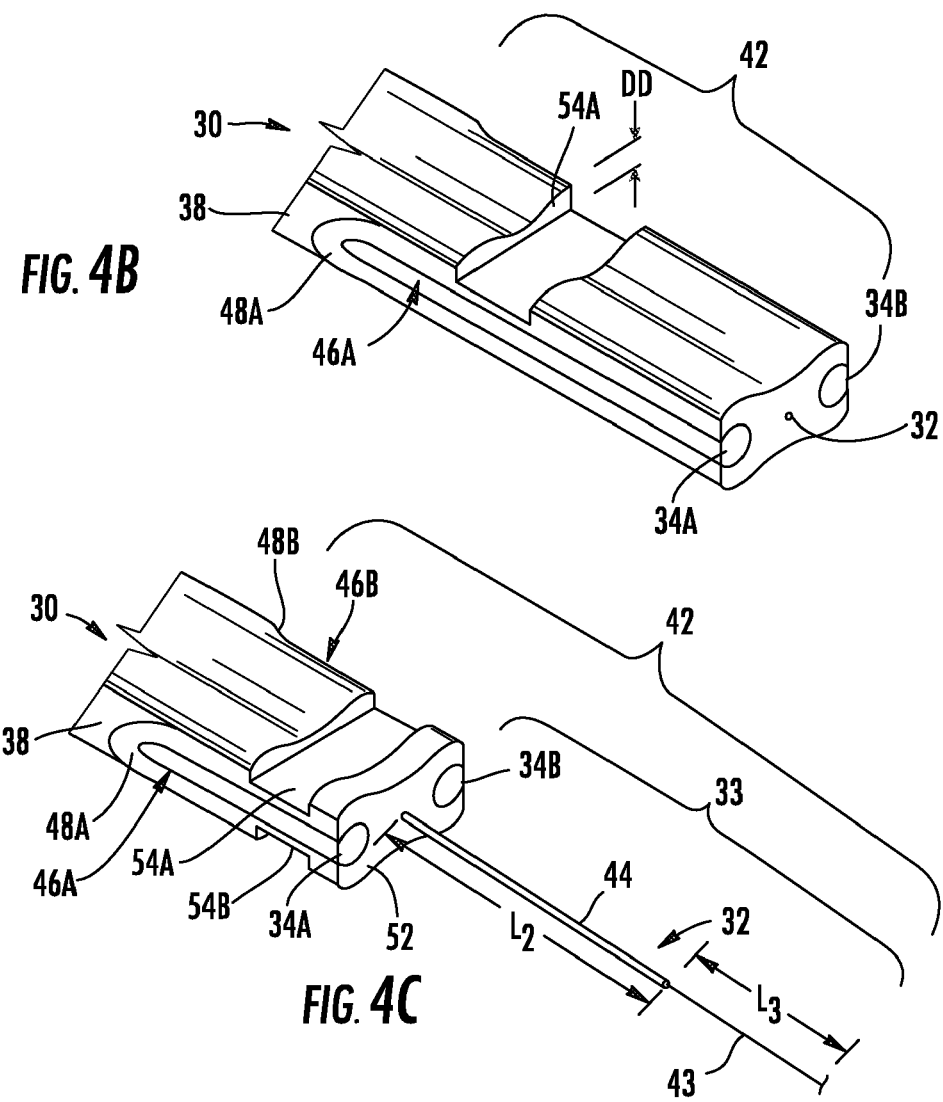
FIG. 4B
FIG. 4C

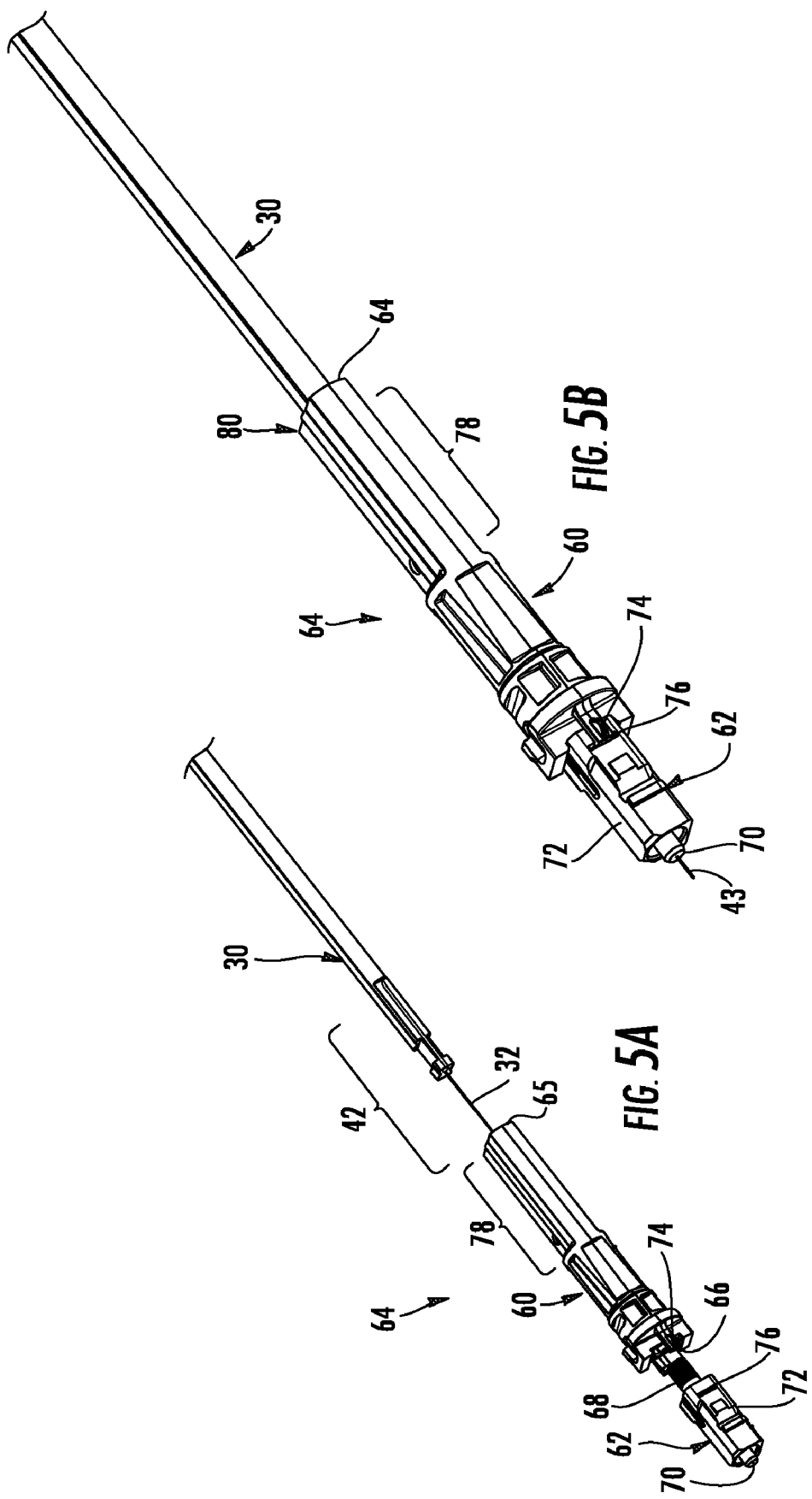

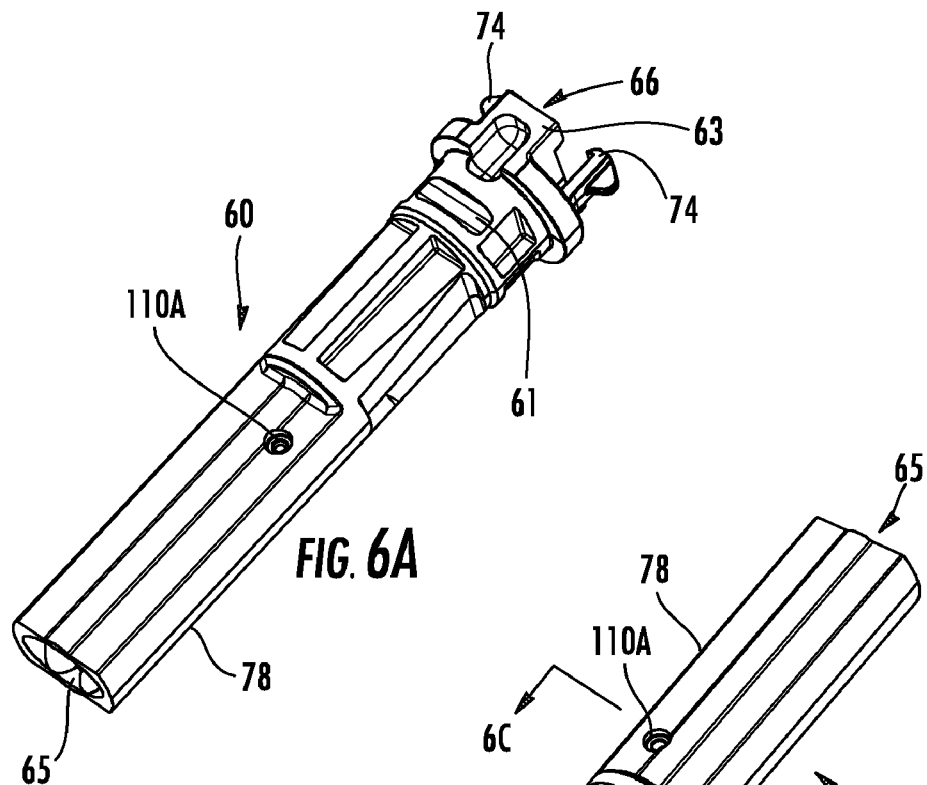
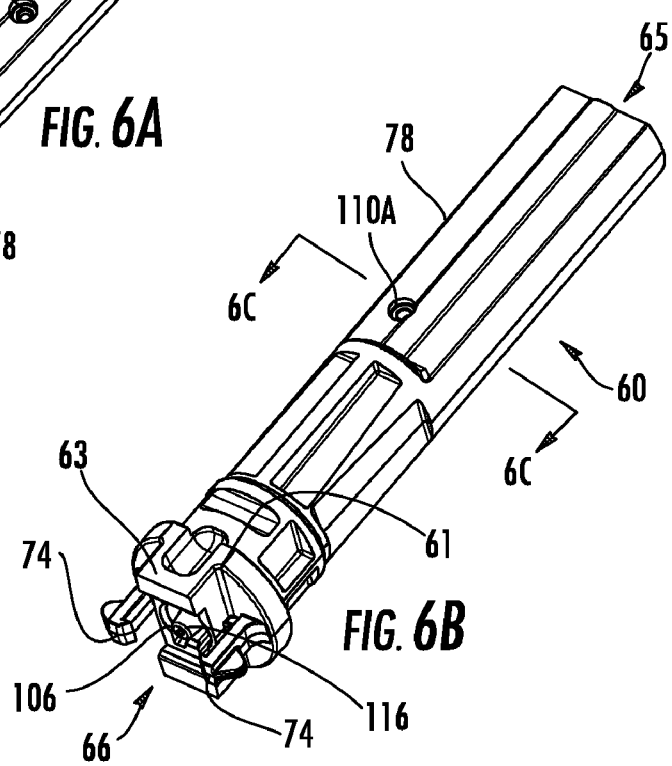
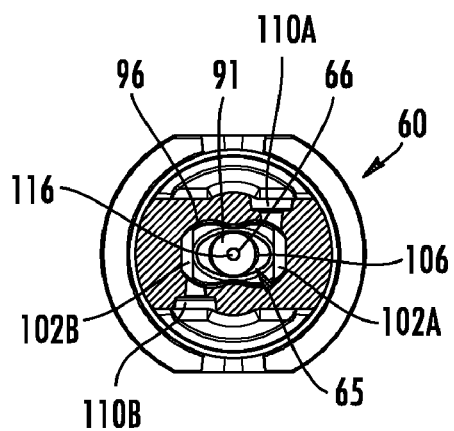
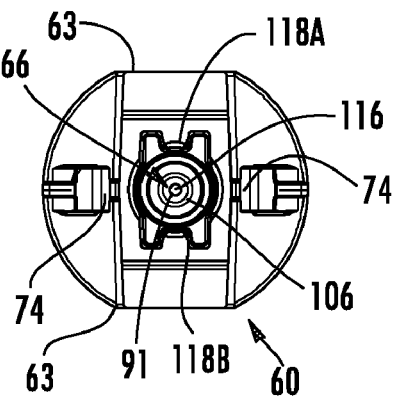
FIG. 6A
FIG. 6B
FIG. 6C
FIG. 6D

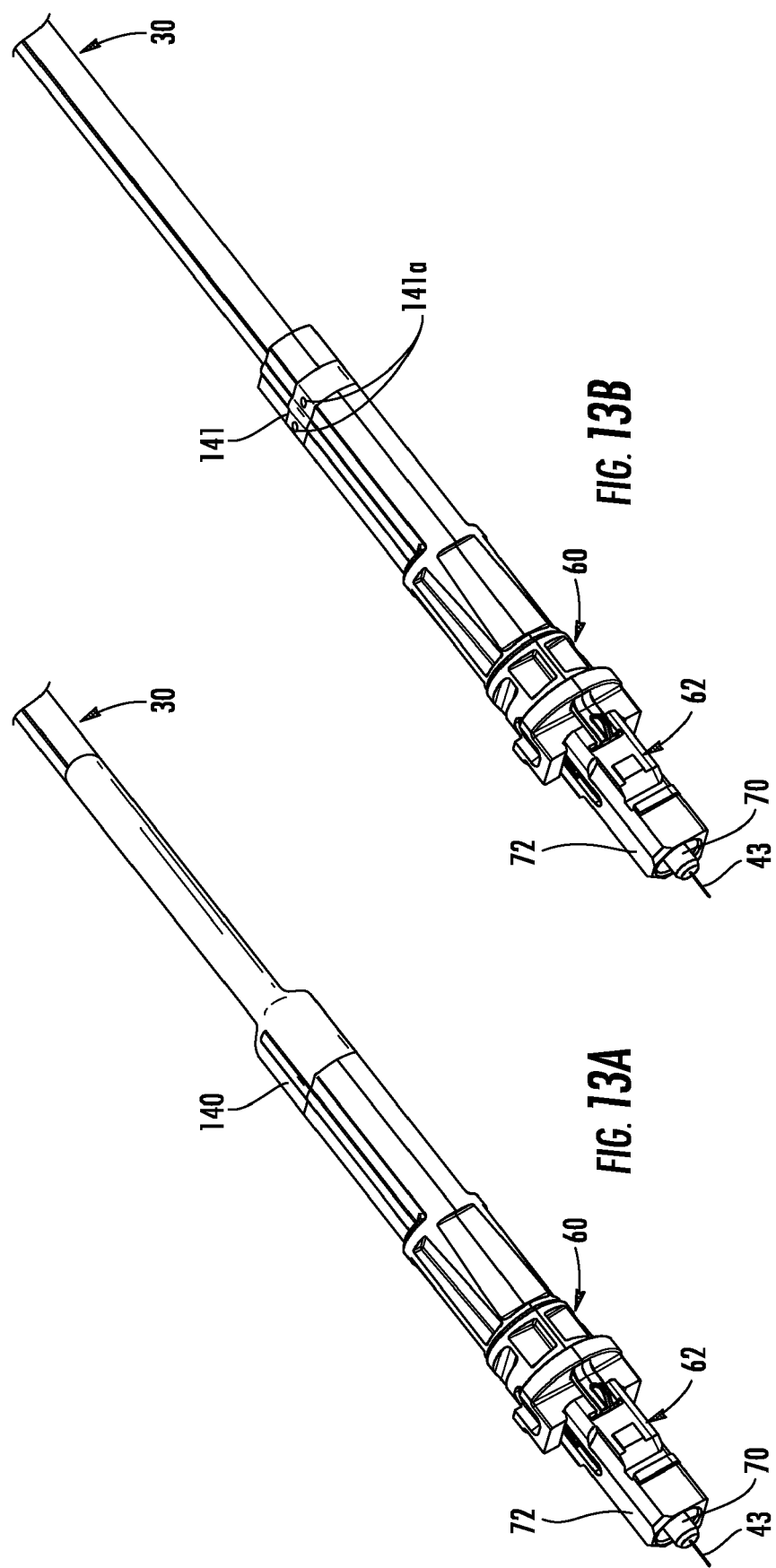

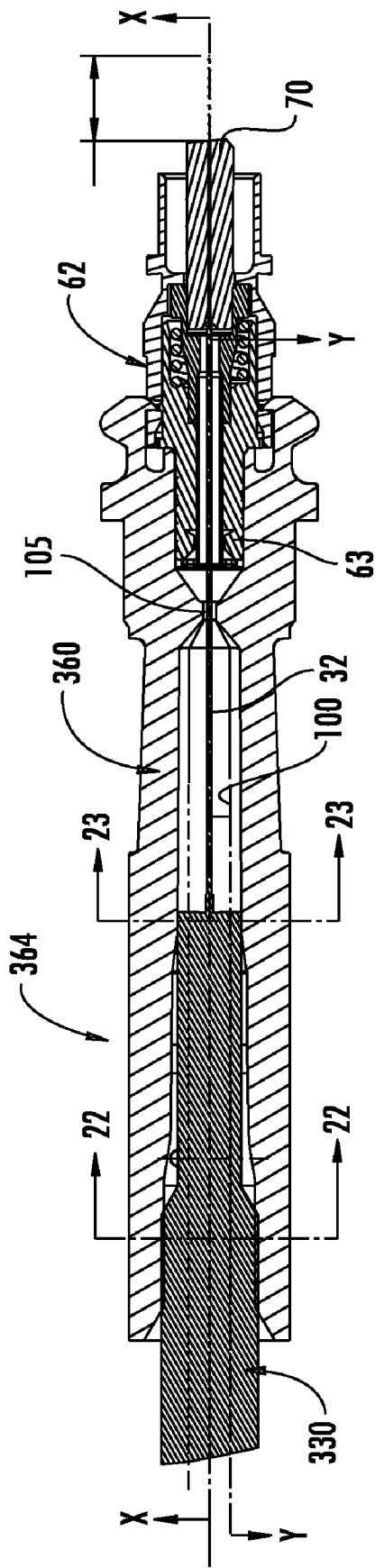
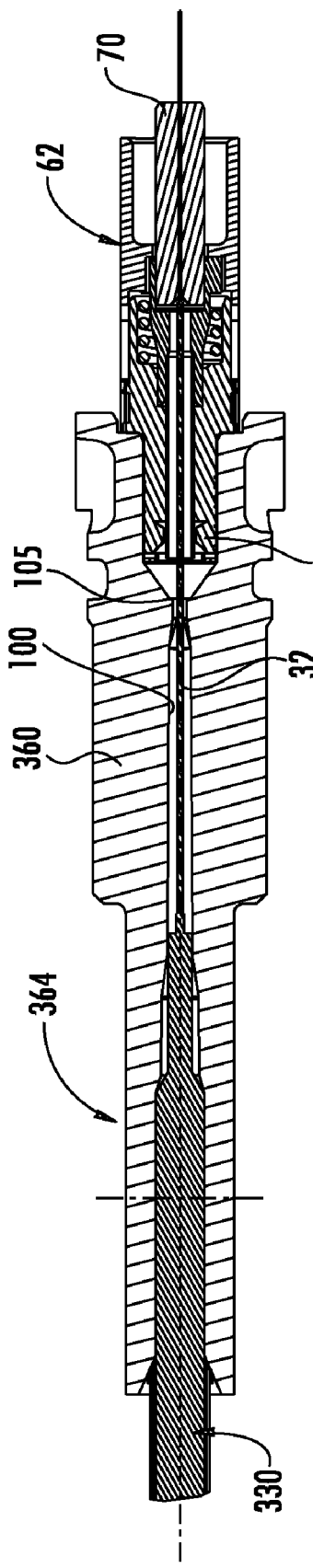
FIG. 20
FIG. 21

RETENTION BODIES FOR FIBER OPTIC CABLE ASSEMBLIES

RELATED APPLICATIONS

The present application is a Continuation-In-Part of U.S. Ser. No. 12/241,346 filed on Sep. 30, 2008, the disclosure of which is incorporated by reference.

BACKGROUND

1. Field of the Invention

The disclosure is directed to a retention body or other fiber optic cable supporting component configured to receive an optical fiber from a fiber optic cable as part of a fiber optic cable assembly. A buckling chamber is included and configured to store any excess optical fiber, such as due to retraction of an optical ferrule.

2. Technical Background

Optical fiber is increasingly being used for a variety of applications, including but not limited to broadband voice, video, and data transmission. Benefits of optical fiber use include extremely wide bandwidth and low noise operation. With the increasing and varied use of optical fibers, it is important to provide efficient methods of interconnecting optical fibers. Fiber optic connectors have been developed for this purpose. It is important that fiber optic connectors not significantly attenuate or alter the transmitted signal. In addition, the fiber optic connector should be relatively rugged and adapted to be connected and disconnected a number of times in order to accommodate changes in the optical fiber transmission path. Because of the skill required in making optical fiber connections, fiber optic cables for fiber to the subscriber and/or other applications are typically preconnectorized with fiber optic connectors by the manufacturer for plug and play connectivity.

FIG. 1 schematically illustrates two different typical installations for preconnectorized fiber optic cables 10 and 10' being routed to a subscriber. Specifically, FIG. 1 shows a first preconnectorized fiber optic cable 10 being routed to a premises 12 in an aerial installation. A second preconnectorized fiber optic cable 10' is routed to the premises 12 in a buried installation. In the aerial installation, a first end 14 of the preconnectorized fiber optic cable 10 is attached at a first interface device 16 located at, or near, a pole 18. A second end 24 of the preconnectorized fiber optic cable 10 is attached at a second interface device 22 located at the premises 12. By way of example, the first interface device 16 may be a closure, multiport (a device having multiple receptacles), or the like. The second interface device 22 may be a closure, network interface device (NID), optical network terminal (ONT), or the like. In the aerial installation, the craft typically uses a pressure clamp 26 (i.e., a p-clamp), as schematically shown in FIG. 1, for securing the preconnectorized fiber optic cable 10 under tension at, or near, pole 18 and/or premises 12, thereby avoiding undue sag in preconnectorized the fiber optic cable 10 along the aerial span. In the buried application, the first and second ends of preconnectorized cable 10' are respectively connected to the interface device 16 located inside a pedestal, a vault, or like 20 and interface device 22.

Termination of fiber optic cables with a simple, reliable, and easy to assemble hardened connector for fiber to the subscriber applications as depicted in FIG. 1 is challenging for many reasons. For instance, the termination should seal to inhibit the ingress of moisture, withstand rugged handling by the craft and endure environmental effects. One test to determine ruggedness of the termination is a pull-out test. The pull-out test measures the force required for mechanical failure by separating the fiber optic cable from the hardened connector when pulling on the fiber optic cable when the connector is fixed. Typical hardened connectors strain relieved the strength members by totally exposing the strength elements from the fiber optic cable and then strain relieving the same with the hardened connector. Illustratively, one commercially successful hardened connector termination is disclosed in U.S. Pat. No. 7,090,407. The disclosed design of the '407 patent can handle different types of fiber optic cables, but the preparation of the fiber optic cables requires totally exposing the strength elements from the fiber optic cable.

Totally exposing the strength elements from some fiber optic cables for termination is easy if there is little to no bond of the strength element with the cable jacket. However, many fiber optic cables used for outdoor applications have a high-degree of bonding between the strength element and the cable jacket. Thereby making total exposure of the strength elements for termination difficult and/or time consuming. Thus, there is an unresolved a need for a robust fiber optic cable termination that is simple, reliable, and easy to assemble.

SUMMARY

Embodiments of the disclosure include fiber optic cable assemblies and related components and assemblies, securing methods, and fiber optic cable preparation methods for securing a fiber optic cable to a retention body or fiber optic connector. An end portion of the fiber optic cable includes at least one strength component and a cable jacket. The end portion of the fiber optic cable is prepared and inserted into a retention body or the like to secure the fiber optic cable to the same. In one embodiment, a portion of one or more strength component(s) of the fiber optic cable is partially exposed while remaining attached to the cable jacket. Thus, totally exposing the strength component is not necessary. Thereafter, the end portion of the fiber optic cable is inserted and secured to the retention body while the strength component and the cable jacket remain secured to each other so they may strain together. In other embodiments using suitable fiber optic cable designs, the strength component may not require partial exposing before insertion into the retention body or the like. In still other embodiments, the end portion of the fiber optic cable may be secured using a mechanical element such as by crimping or penetrating the end portion of the fiber optic cable after insertion into the retention body or the like.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 2C and 2D are side and top views, respectively, of the fiber optic cable illustrated in FIGS. 2A and 2B;

FIGS. 2E and 2F are perspective views of other explanatory fiber optic cables having an end portion in accordance with other embodiments;

FIGS. 4A-4C illustrate exemplary steps for preparing the end portion of the fiber optic cable illustrated in FIGS. 2A and 2B;

FIGS. 5A and 5B illustrate a fiber optic cable assembly with the prepared fiber optic cable of FIGS. 2A and 2B inserted into a retention body;

FIGS. 6A and 6B are perspective views of the retention body of FIGS. 5A and 5B;

FIGS. 6C and 6D respectively illustrate a cross-sectional view and a front view of the retention body of FIGS. 6A and 6B;

FIGS. 13A and 13B are perspective views of the retention body of FIGS. 6A and 6B illustrating alternate methods for securing the fiber optic cable using mechanical elements;

FIGS. 20 and 21 are respective cross-sectional views of the retention body shown in FIGS. 18 and 19 with the fiber optic cable of FIG. 17 secured thereto;

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts.

The embodiments described herein include fiber optic cable assemblies and related components, securing methods, and fiber optic cable preparation methods for securing a fiber optic cable to a retention body or the like, which may further form a fiber optic connector (i.e., termination of the fiber optic cable with a fiber optic connector). Disclosed methods and terminations prepare an end portion of a fiber optic cable for insertion into a retention body of a hardened fiber optic connector. Moreover, the concepts of the disclosure advantageously strain-relieve the end portion of the fiber optic cable without requiring totally exposing the strength components of the fiber optic cable while still providing a robust termination. Reference will now be made in detail to the preferred embodiments, examples of which are illustrated in the accompanying drawings. Whenever possible, like reference numbers will be used to refer to like components or parts.

FIGS. 2A-2D illustrate various views of an explanatory fiber optic cable 30 and preparation features having a portion of at least one strength component partially exposed for bonding while still being secured to a cable jacket of the fiber optic cable. Thus, the strength components of the fiber optic cable are prepared for attachment, without fully stripping, i.e., without totally exposing a portion of the strength component from the cable jacket. This allows a reliable and quick method for securing the fiber optic cable with a suitable pull-out strength, while maintaining the dimensional relationship between strength component(s) and the cable jacket when the fiber optic cable is stressed. For example, the fiber optic cable assembly may have a pull-out force requirement of 100 pounds or more such as 150 pounds or even up to 300 pounds or more. Although, fiber optic cable 30 is discussed in detail herein, the concepts of the invention may use any suitable type and/or construction of fiber optic cable. Illustratively, FIG. 2E depicts a fiber optic cable 130 in accordance with another embodiment of the disclosure. Although fiber optic cables with flat cross-sections are shown the concepts of the invention may be used with cables having other cross-sectional shapes such as round or the like.

Figure 1:
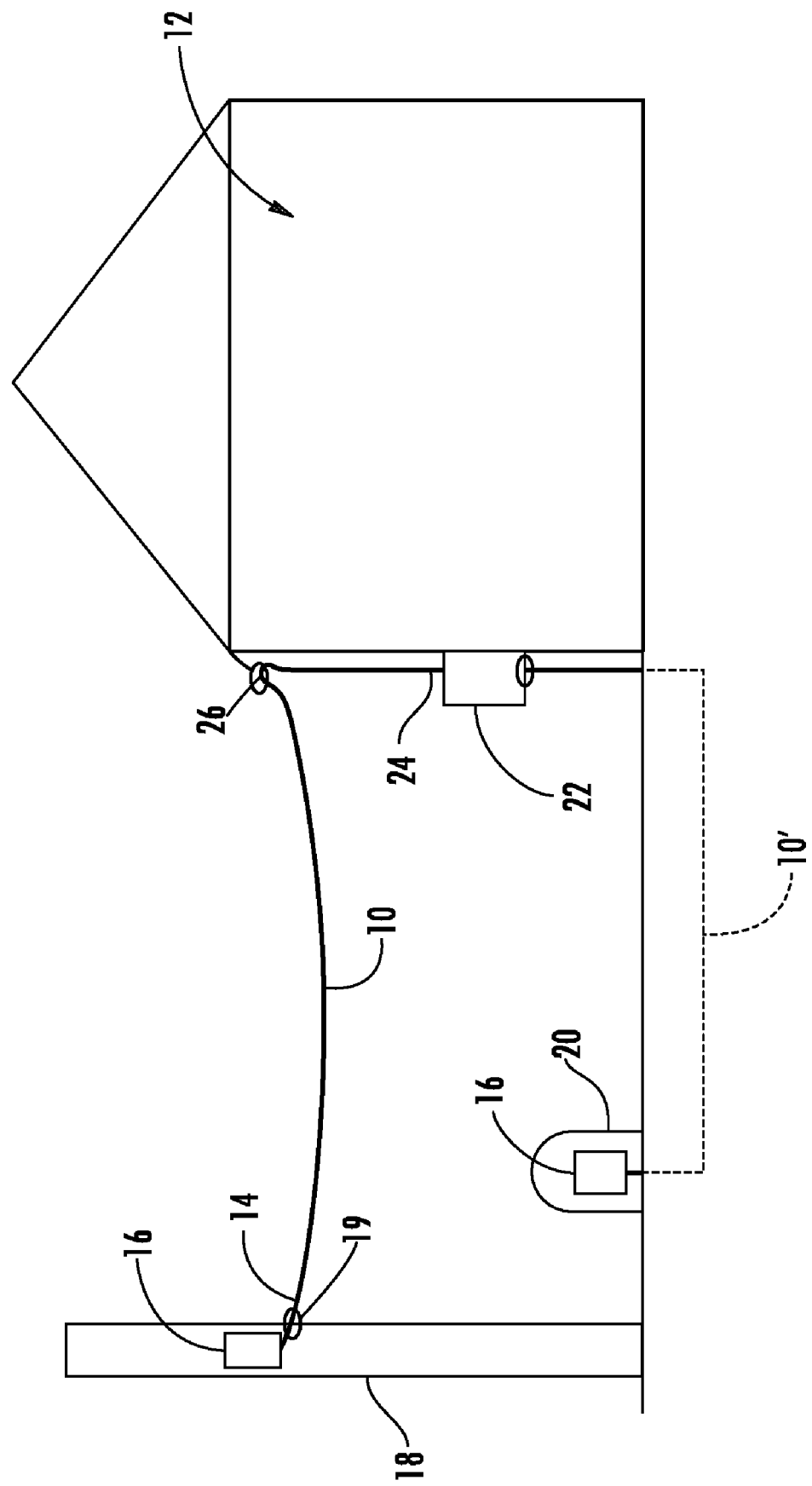
FIG. 1 is a schematic illustration of the drop link portion of an optical network being routed to a premises using different installations techniques.
Figure 2A:
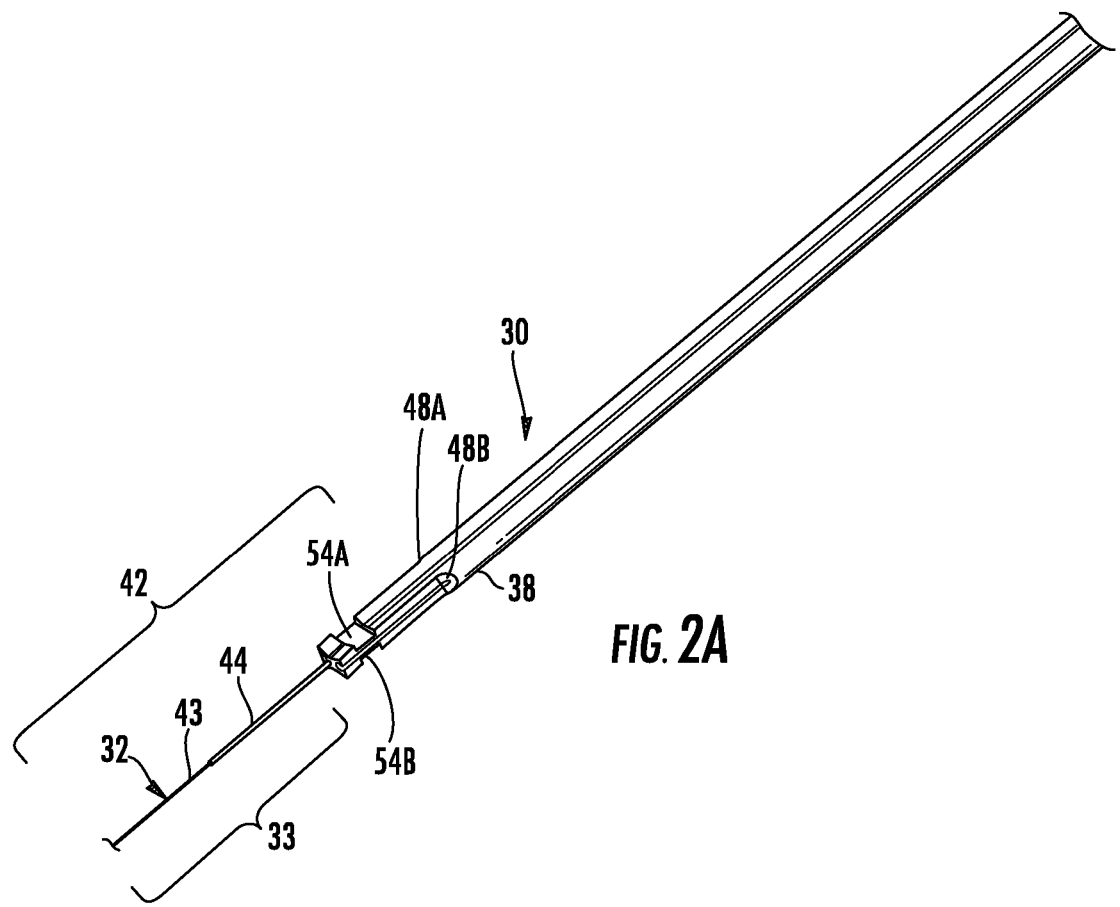
FIGS. 2A and 2B are perspective views of an explanatory fiber optic cable having an end portion with features prepared in accordance with one embodiment.
Figure 2B:
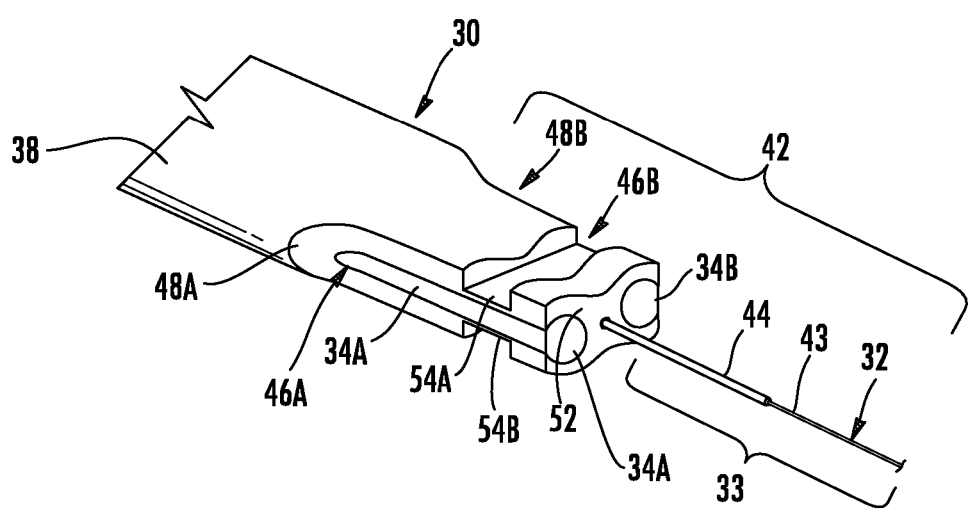

FIGS. 2A and 2B illustrate perspective views of fiber optic cable 30 having an end portion 42 prepared for securing to a component of a fiber optic connector. Fiber optic cable 30 includes at least one optical fiber 32, first and second strength components 34A, 34B, and a cable jacket 38. As shown a portion of first and second strength component 34A, 34B are at least partially exposed from cable jacket 38 as defined below. FIGS. 2C and 2D respectively depict side and top views of the end portion 42 of fiber optic cable 30. End portion 42 of fiber optic cable 30 includes preparation features for securing it with a suitable component such as the retention body illustrated in FIGS. 5A and 5B or FIG. 7A using a bonding agent, mechanical elements, or the like. One preparation feature includes partially exposing a portion of one or more strength components. As used herein, "partially exposing" or "partially exposed" means removing a portion of the cable jacket so that a portion of the strength component is revealed while a remaining portion of the strength component along a similar longitudinal location remains attached (i.e., at the other side of the strength component) to the cable jacket. Additionally, FIGS. 2A and 2B also reveal that a portion of first and second strength components 34A, 34B are shaved for increasing the surface area for bonding. In other words, a portion of the strength components are shaved without an excessive loss in tensile strength, thereby creating a larger surface area (i.e., a planar surface instead of a line surface for the partially exposed strength components). Preparation of end portion 42 also includes exposing a portion 33 of optical fiber 32 from cable jacket 38.

In addition to creating more surface area for bonding, shaving a portion of the strength component can have other advantages. For instance, removing a portion of the strength component also removes any coating and/or disturbs the surface tension of strength component, thereby allowing wicking of a bonding agent into the strength component for improved bonding. However, this may not be necessary if the strength component does not have a coating and/or is formed from a material that naturally wicks. By way of example, a textured glass-reinforced polymer (GRP) may naturally wick and may not require shaving a portion of the strength component to achieve the desired robustness.

Figure 17:
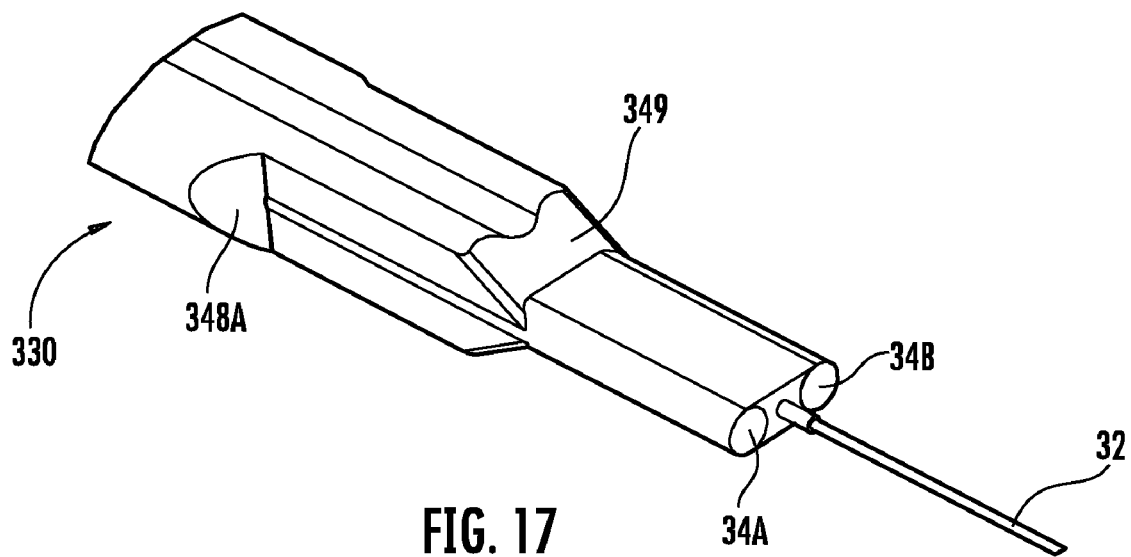
FIG. 17 is a perspective view of another explanatory fiber optic cable having an end portion prepared for insertion to the retention body.

Still other embodiments are possible that do not require partially exposing the strength components at the end portion of the cable. For instance, FIG. 2E depicts a fiber optic cable 130 prepared for insertion into a retention member or other suitable component. In other words, the retention body or other suitable component is secured to the cable jacket of fiber optic cable 130, instead of being secured to a portion of the strength component(s). Fiber optic cable 130 should have a suitable bond strength between the strength components and the cable jacket to transfer forces from the cable jacket to the strength component(s). Additionally, the cable jacket material should have a suitable rigidity for supporting the desired bond characteristic. FIG. 2F depicts another fiber optic cable 230 prepared for insertion into a retention member or other suitable component. Fiber optic cable 230 has more than two sides shaved for partially exposing strength components 34A, 34B. Specifically, fiber optic cable 230 has a portion of the cable jacket removed on all four sides all the way to the front surface, thereby creating a uniform cross-section to the front surface unlike fiber optic cable 30. Yet other variations for stripping fiber optic cables for insertion into a retention body are possible such as depicted in FIG. 17.

Figure 3:
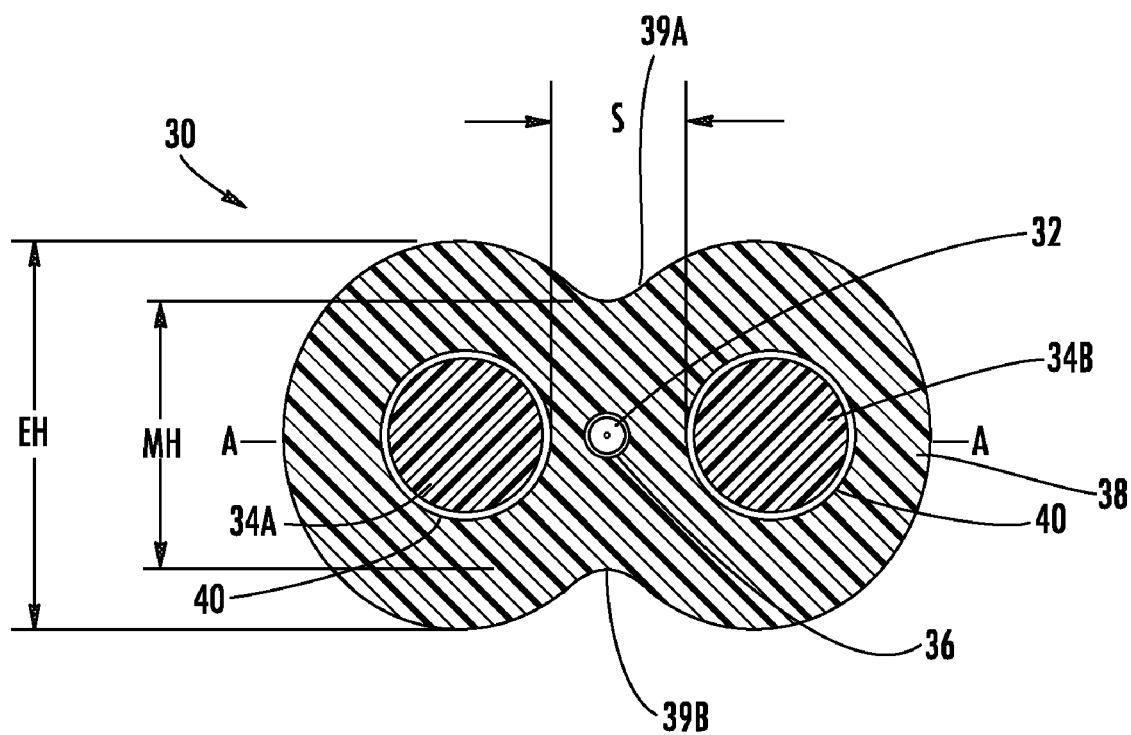
FIG. 3 is a cross-sectional view of the fiber optic cable illustrated in FIGS. 2A and 2B.

FIG. 3 illustrates a cross-sectional view of fiber optic cable 30 of FIGS. 2A-2D before preparation. If desired, optical fiber 32 may include an upcoating 36 for improving the handability by the craft and/or robustness. By way of example, upcoating 36 can be any suitable material, such as a UV-curable or polymer upcoating disposed on optical fiber 32. Upcoating 36 may take the optical fiber 32 to 500 micrometers (μm) in diameter or other desired size like 900 micrometers (μm) for example, but other sizes are possible like 700 micrometers (μm). In this fiber optic cable embodiment, the first and second strength components 34A, 34B are disposed (i.e., embedded) within the cable jacket 38 on opposite sides of optical fiber 32 and generally aligned along a common plane A-A, thereby providing a preferential bend characteristic to fiber optic cable 30. Generally speaking, the strength components 34A, 34B are much larger in size than the optical fiber 32 and are selected to provide the desired tensile strength requirements for the fiber optic cable 30. By way of example, the first and second strength components 34A, 34B are dielectric members, such as glass-reinforced plastic (GRPs), having a diameter of about 1.25 millimeters for example, but other sizes, shapes, and/or materials are possible for the strength components.

Fiber optic cable 30 is advantageous, because it has a relatively small cross-sectional footprint compared with conventional fiber optic drop cables used for fiber to the subscriber, or node, applications, thereby providing a relatively large slack storage capacity for excess length while still being robust. However, in order to provide a robust design with the small cross-sectional footprint specific design characteristics are required for fiber optic cable 30. For instance, to promote bonding with the cable jacket 38, the first and second strength components 34A, 34B typically include one or more adhesion promoters 40 thereon, such as selected from the ethylene-acrylic family such as an ethylene-acrylic acid (EAA), but other materials or mechanisms are possible for adhesion. The adhesion promoter allows for the transfer of forces from the cable jacket to the strength components without peeling off the cable jacket such as when installed within a pressure-clamp. However, this bonding can make conventional cable preparation techniques for connectorization much more difficult. As shown, fiber optic cable 30 has a generally dog-bone cross-section due to the smaller medial height MH formed by indentations 39A, 39B disposed above and below optical fiber 32. This dog-bone cross-section allows for improved crush performance in a pressure clamp. In other words, the cable jacket 38 has a medial height MH disposed about the optical fiber 32 that is less than an end height EH of the fiber optic cable 30 for inhibiting the transfer of crushing forces to the optical fiber 32 when fiber optic cable is disposed within a pressure clamp or the like. Additionally, first and second strength components 34A, 34B have a spacing S therebetween which can affect the level of stress experienced by optical fiber during crushing or the like. Fiber optic cable 30 discussed herein is also disclosed in co-pending U.S. patent application Ser. No. 11/986,705 entitled "FIBER OPTIC CABLES AND ASSEMBLIES FOR FIBER TOWARD THE SUBSCRIBER APPLICATIONS" assigned to the same assignee as the present application.

Fiber optic cables require preparing their end portions prior to connectorization. By way of example, FIGS. 4A-4C depict explanatory steps for preparing end portion 42 of fiber optic cable 30 shown in FIGS. 2A-2D. Additionally, it is possible to perform the steps shown in FIGS. 4A-4C in any suitable order, multiple steps, and/or a single step. FIG. 4A illustrates a step of forming one or more cross-flow channels 54A, 54B in cable jacket 38. As illustrated in FIG. 4A, a portion 55 of the cable jacket 38 is removed, thereby forming cross-flow channel 54A. As depicted, another portion of cable jacket 38 is removed from the other side of fiber optic cable 30, thereby forming a second cross-flow channel 54B (not visible). Although, cross-flow channels 54A, 54B are depicted generally perpendicular to the longitudinal axes 45A, 45B of the strength components 34A, 34B, they can have other suitable angles besides generally perpendicular. Cross-flow channels 54A, 54B are preferably formed so that the partially exposed portions 46A, 46B of the strength components 34A, 34B are in communication with each other across the cross-flow channel. Thus, when end portion 42 of the fiber optic cable 30 is inserted into the retention body, one or more bonding chambers are formed within the space between the retention body and the fiber optic cable.

Consequently, a bonding agent injected into one bonding chamber adjacent the first strength component 34A can flow into and through the cross-flow channels 54A, 54B to the other bonding chamber adjacent the second strength component 34B, or vice versa. Providing one or more cross-flow channels is advantageous since it provides a pathway for a bonding agent to flow from one bonding chamber to another bonding chamber more quickly and aids with even distribution and/or filling the bonding chambers. Cross-flow channels 54A, 54B may have a suitable depth dimension DD and/or a width dimension WW as long as it does not compromise the integrity of the optical fiber, the strength components, and/or the termination. In one embodiment, the depth dimension DD of cross-flow channels 54A, 54B are about 1 millimeter to partially expose a portion of the strength component and the width dimension WW is about 5 millimeters (mm). In another variation, two 2 millimeter cross-flow channels are formed on each side of fiber optic cable 30. Of course, other embodiments can use a single cross-flow channel 54 or eliminate the cross-flow channel altogether. Additionally, with a suitable fiber optic cable design it is possible to partially expose the strength component on the top and bottom (i.e., cross-cut channels) without partially exposing the strength component on one or more sides of the fiber optic cable as discussed below.

FIG. 4B depicts a step of partially exposing one or more strength components 34A, 34B of fiber optic cable 30 so the retention body can be secured thereto. As shown, a portion of cable jacket 38 is removed on opposing sides of the end portion 42 adjacent the front surface and along the longitudinal axes of strength components 34A, 34B, thereby forming one or more partially exposed portions 46A, 46B of strength components 34A, 34B. As depicted, a portion of strength components 34A, 34B may be removed during this step, thereby partially exposing more surface area (i.e., a larger surface area) of the strength components for bonding purposes. FIG. 2D shows that partially exposed portions 46A, 46B are formed by removing portions with a width $W_1$ on both sides of fiber optic cable 30. Partially exposed portions 46A, 46B allow bonding of the strength components 34A, 34B (and/or cable jacket 38) with the retention body. By way of example, the length of the cable jacket 38 removed and/or strength component shaved to form partially exposed portions 46A, 46B may be any suitable length. Additionally, a portion of the strength components 34A,34B remain bonded with cable jacket 38, thereby allowing the components to strain together. Preferably, the surface area of partially exposed portions 46A, 46B are about five percent (5%) or more of the surface area per length of the cylindrical surface area of the unaltered strength component to promote bonding, more preferably, partially exposed portions 46A, 46B are between about ten percent (10%) to about eighty (80%) percent or more to promote bonding.

Cable jacket 38 may be cut, shaved, or otherwise removed to form partially exposed portions 46A, 46B of the strength components 34A, 34B. If cutting or shaving is employed, the cable jacket 38 and a portion of the strength components 34A, 34B may be cut or shaved across the cable jacket 38 and a cross-sectional plane of the strength components 34A, 34B, thereby forming a surface such as a substantially flat surface having partially exposed portions 46A, 46B of the strength components 34A, 34B surrounded on each side by cable jacket 38. Any method of removing, cutting, or shaving cable jacket and strength components are possible for partially exposing at least a portion of one or both of the strength components 34A, 34B from the cable jacket 38 while a portion of one or both of the strength components 34A, 34B remains secured to cable jacket 38. Of course, other embodiments can use other end portion structures and/or techniques.

Not only do partially exposed portions 46A, 46B of the strength components 34A, 34B allow direct bonding to the strength components 34A, 34B while remaining secured to the cable jacket 38, but the removal of portion of the cable jacket 38 to form partially exposed portions 46A, 46B form cavities (i.e., chambers) when the end portion 42 of the fiber optic cable 30 is inserted into a passage of the retention body, or the like, designed to accept the geometry of fiber optic cable 30. These cavities form one or more bonding chambers that allow for a bonding agent, such as an epoxy or the like, to be injected into the space. Simply stated, the bonding agent bonds one or both of the partially exposed portions 46A, 46B of strength components 34A, 34B to one or more internal surfaces of the retention body for securing fiber optic cable 30 with the retention body. The length of the partially exposed portions 46A, 46B is based on design criteria such as the desired bond strength, the overall length of the retention body or connector and the like. Illustratively, in one embodiment the length of the partially exposed portions 46A, 46B may be about 20 millimeters (mm); however, any suitable length of partially exposed portion is possible.

Additionally, this partially exposing step also forms other beneficial geometry. For instance, back sealing locations 48A, 48B may also be formed as a result of removing, cutting, and/or shaving cable jacket 38 to form partially exposed portions 46A, 46B of strength components 34A, 34B. Back sealing locations 48A, 48B may provide locations for abutting against an internal structure of a passage of the retention body, or other suitable component, thereby closing off the passage at the rear end when the fiber optic cable is fully seated therein. As shown, back sealing locations 48A, 48B are formed as the cutaway transitions to the outer surface of cable jacket 38 and can have any suitable shape. In other words, back sealing locations 48A, 48B may serve to close off the rear portions of the bonding chamber(s) so that the bonding agent is inhibited from escaping when the end portion 42 of the fiber optic cable 30 is fully inserted into the retention body. Back sealing locations 48A, 48B may have any suitable geometry such as being disposed perpendicular to the longitudinal axes of the strength components 34A, 34B. Simply stated, the geometry is configured to mate with an internal structure of the intended retention body, or other suitable component having complimentary geometry. Width $W_1$ (FIG. 2D) of the back sealing locations 48A, 48B extend from an outside edge of the cable jacket 38 to an outside edge of strength components 34A, 34B. For this embodiment, width $W_1$ is between about 700 microns (0.7 millimeters) and about 1000 microns, but other widths and/or geometry are possible for creating back sealing locations depending on the fiber optic cable/retention body configuration. Other embodiments such as fiber optic cable 130 may use an interference fit between the unaltered (i.e., uncut) cable jacket and the passage of the retention body as the back sealing location.

FIG. 4C depicts another step for preparing the end portion 42 of fiber optic cable 30. Specifically, the step of FIG. 4C exposes the desired amount of optical fiber 32 at the end of the fiber optic cable 30 by severing the strength components 34A,34B and cable jacket 38 and removing a portion of the cable jacket 38 from optical fiber 32. Additionally, this step forms a front surface 52. Thus, the desired length of optical fiber 32 is exposed for inserting into a ferrule for connectorization. Preferably, the portion of the cable jacket 38 and strength components 34A, 34B removed are cut or trimmed along a plane that is generally perpendicular to the longitudinal axis of the fiber optic cable, but other angles are possible. Consequently, the exposed portion 33 of optical fiber 32 extends beyond cable jacket 38 to the desired length as shown. More specifically, a bare portion 43 (i.e., core and cladding of the optical fiber) and coated portion 44 (i.e., core, cladding, fiber coating, and an optional buffer layer or cable jacket) of the optical fiber 32 are exposed. Generally speaking, this step may employ a mechanical and/or thermal method for stripping the fiber coating and/or the cable jacket as known in the art. In other embodiments, optical fiber 32 may have a thin portion of cable jacket 38 disposed thereon that extends beyond front surface 52.

By way of example, the total length of exposed portion 33 of optical fiber 32 is between about 20 millimeters and 40 millimeters, which is the sum of a length $L_2$ and a length $L_3$ as illustrated in FIG. 4C. Of course, other suitable lengths are possible depending the retention body/fiber optic cable configuration. Thereafter, a portion of the optical fiber coating is removed from the optical fiber 32 to expose the bare portion 43 of the same (i.e., length $L_3$) for extending into a ferrule. For instance, the coated portion 44 of the optical fiber is exposed to a length of about 20 millimeters, illustrated as length $L_2$, and the bare portion 43 is about 20 millimeters, as illustrated by length $L_3$. Thereafter, bare portion 43 of optical fiber 32 can be inserted and extended through the ferrule of the optical connector for cleaving and polishing of the ferrule end face in subsequent operations. As shown, the coating is left on coated portion 44 of optical fiber 32 for handling and stability when inserting the bare portion 43 of the optical fiber 32 into the ferrule during assembly.

Like the back sealing locations 48A, 48B, front surface 52 is formed when a portion of the cable jacket 38 and/or strength components 34A, 34B are removed from the end portion 42 of fiber optic cable 30. As will be described later in this application, the front surface 52 is configured to abut against an internal surface of the retention body or the like. Simply stated, front surface 52 closes off the front ends of the bonding chambers when the end portion 42 of fiber optic cable 30 is fully inserted into the retention body. In this embodiment, the height of cable jacket 38 is not uniform across its width, thus, the height of the front surface 52, is also not uniform in the same regard. As shown, the width of the front surface 52 is smaller than a width $W_2$ of cable jacket 38 (FIG. 2D) and is tailored to cooperate with the passage of retention body 60.

FIGS. 5A and 5B illustrate fiber optic cable 30 being inserted into a retention body 60 and a fiber optic connector sub-assembly 62, thereby forming a fiber optic cable assembly 64. Specifically, FIG. 5A depicts end portion 42 of fiber optic cable 30 being inserted into a rear end opening 65 of retention body 60 and into a retention body passage extending thererthrough. More specifically, bare portion 43 of optical fiber 32 extends through a front end opening 66 of retention body 60 past a ferrule holder 68 and into a bore (not numbered) of a ferrule 70 as shown in FIG. 5B. Fiber optic connector sub-assembly 62 includes ferrule 70 and a connector housing 72 that houses and supports ferrule holder 68. Additionally, the fiber optic sub-assembly may also include a spring for biasing the ferrule forward. Fiber optic connector sub-assembly 62 may be any suitable configuration type such as a SC-type or LC-type, but other types fiber optic connector sub-assemblies are possible. Retention body 60 supports fiber optic cable 30 such that the bare portion 43 of the optical fiber 32 is securely retained inside ferrule 70 for inhibiting the effect of changes in optical fiber 32 length or misalignment issues when fiber optic cable 30 undergoes stress (e.g., compression, tension, side-load, etc.). During assembly, fiber optic connector sub-assembly 62 is attached to retention body 60, thereby forming fiber optic cable assembly 64. Specifically, fiber optic connector sub-assembly 62 is attached to retention body 60 by snap-fitting with interlocking fingers 74 disposed on opposite sides of retention body 60. Interlocking fingers 74 are configured for latching into recessions 76 formed into and on opposite sides of the connector housing 72 of fiber optic connector sub-assembly 62.

Retention body 60 also includes a lead-in portion 78 integrally formed therewith that extends from a medial portion of retention body 60 toward the rear for supporting the fiber optic cable 30. Lead-in portion 78 is optional portion of retention body 60, but it reduces the possibility of sharp bending of fiber optic cable 30 adjacent to retention body 60, thereby inhibiting side-load stress from cracking and/or splintering strength components, which can reduce their strength. This is because lead-in portion 78 extends the point where the side-loading and/or bending force is applied on fiber optic cable 30 with respect to retention body 60. Retention body 60 and its lead-in portion 78 are relatively rigid so that when a side-load or bending force is applied to the fiber optic cable 30 it applies the bending force about the retention body 60. In other words, lead-in portion 78 provides a longer support surface for cradling/supporting the fiber optic cable. In other embodiments, lead-in portion 78 may also provide a crimping portion for a crimp band and/or can have a heat shrink tubing disposed about a portion to further secure and/or seal the interface between the retention body 60 and fiber optic cable 30.

FIGS. 6A and 6B illustrate rear and front perspective views of retention body 60. As illustrated, lead-in portion 78 of the retention body 60 contains a first orifice 110A for injecting a bonding agent into retention body 60. First orifice 110A may also be placed in other portions of the retention body 60. In this embodiment, first orifice 110A is in communication with a bonding chamber 94A (FIG. 9) provided internally to the retention body 60 when end portion 42 of fiber optic cable 30 is fully inserted into a retention body passage 91. First orifice 110A provides a port for injecting a bonding agent into bonding chamber 94A (also illustrated in FIG. 9) during construction of fiber optic cable assembly 64. A bonding agent may be employed to bond the partially exposed portions 46A,46B of strength components 34A,34B to the retention body 60, thereby facilitating securing the components together. Any suitable type of bonding agent may be used. Illustratively, the bonding agent may be radiation curable epoxy such as a visible light curable epoxy or an ultraviolet (UV) light curable epoxy, a heat curable epoxy, adhesive, resin, glue, or the like for securing the same. If a radiation curable substance is used such as a light or UV curable epoxy, then the retention body 60 should be translucent for allowing the radiation to cure the radiation curable substance in a suitable manner. By way of example, a suitable bonding agent is a 2-part heat curable epoxy available from Masterbond of Hackensack, N.J. under the tradename EP62-1TK. Another suitable bonding agent having a thicker viscosity is available from Loctite of Moorsville, N.C. under the tradename Hyso1-0151.

Likewise, a second orifice 110B (FIG. 6C) may also be formed in the opposing side of lead-in portion 78. Second orifice 110B can have one or more different purposes. For instance, a second orifice can be used for venting (i.e., allowing air to escape when injecting a bonding agent) of the first orifice 110A, used to inject the bonding agent and/or used to determine if the bonding chamber is adequately filled. In this embodiment, second orifice 110B is generally aligned with the first orifice 110A (i.e., located in a similar transverse cross-sectional plane). Like the first orifice 110A, the second orifice 110B is in communication with a second bonding chamber 94B (FIG. 110B) internally to the retention body 60 when the end portion 42 of fiber optic cable 30 is fully inserted into retention body passage 91. Second orifice 110B may provide another location for injecting the bonding agent into the second bonding chamber 94B, thereby securing the partially exposed portion 46B of the strength component 34B and a portion of cable jacket 38 with retention body 60. For example, if a cross-flow channel is not provided in the end portion 42, providing the first and second orifices 110A 110B allows the bonding agent to be injected separately into both bonding chambers 94A, 94B, but another vent may be necessary. Additionally, if cross-flow chambers are provided the second orifice 110B may be used to determined when the chamber is substantially full. In other embodiments, the second orifice may be on the same side or any other suitable location.

FIGS. 6C and 6D respectively illustrate a cross-sectional view and a front view of the retention body 60. As illustrated in FIG. 6C, the retention body 60 has a rear end opening 65 that generally matches the general exterior profile of fiber optic cable 30, thereby providing a snug fit between the cable jacket 38 and the retention body 60. Other embodiments of the retention body match the general exterior profile of the fiber optic cable intended for use therewith. Retention body passage 91 extends from rear end opening 65 where it is sized for the exterior profile of fiber optic cable 30 to front end opening 66 that is sized for the bare optical fiber 43 to extend therethrough. As shown in FIG. 6C, the inner diameter of the front portion of retention body passage 91 tapers in a conical fashion 106 and terminates at front end opening 66 of the retention body 60. Although, the front portion is generally conical other shapes/geometries are possible for reducing the size toward the front portion.

A front sealing structure 96 is also visible in FIG. 6C along with sealing structures 102A, 102B. Generally speaking, bonding chambers 94A, 94B are closed off at the front sealing structure 96 and sealing structures 102A, 102B of retention body 60 after the prepared fiber optic cable 30 is inserted therein. The bonding chambers are closed off so that the bonding agent injected into the respective bonding chambers does not undesirably escape. Front sealing structure 96 along with sealing structures 102A, 102B of retention body 60 respectively abut with the front surface 52 and the back sealing locations 48A, 48B of the fiber optic cable 30 for closing off the bonding chambers 94A, 94B at the front end. Other embodiments of the retention body can use other shapes and/or geometries for inhibiting the bonding agent from escaping. For instance, a simple interference or friction fit may be employed between the fiber optic cable and the retention body or the like. FIG. 6D illustrates the front end view of the retention body 60 showing that cone 106 that carries the optical fiber 32 extends through a front end orifice 116 formed by the retention body 60. Retention body 60 also includes protrusions 118A, 118B at the front end for providing lateral stability for the connector housing of fiber optic connector sub-assembly 62.

Retention body 60 also includes features that may interface with other components of a connector. For instance, retention body 60 includes a locking feature 61 for attaching the same with a connector component. In this embodiment, locking features 61 are disposed on opposite sides of retention body 60 for attaching with the connector component as described herein. As best shown in FIG. 6D, retention body 60 also includes one or more alignment features 63. In this embodiment, alignment features 63 are disposed on opposite sides of the front end of retention body 60. Specifically, alignment features 63 are flat portions that generally align the retention body such as during assembly of the connector as discussed herein. In other embodiments, retention bodies can have alignment features that allows assembly with other components in only one orientation.

Figure 7A:
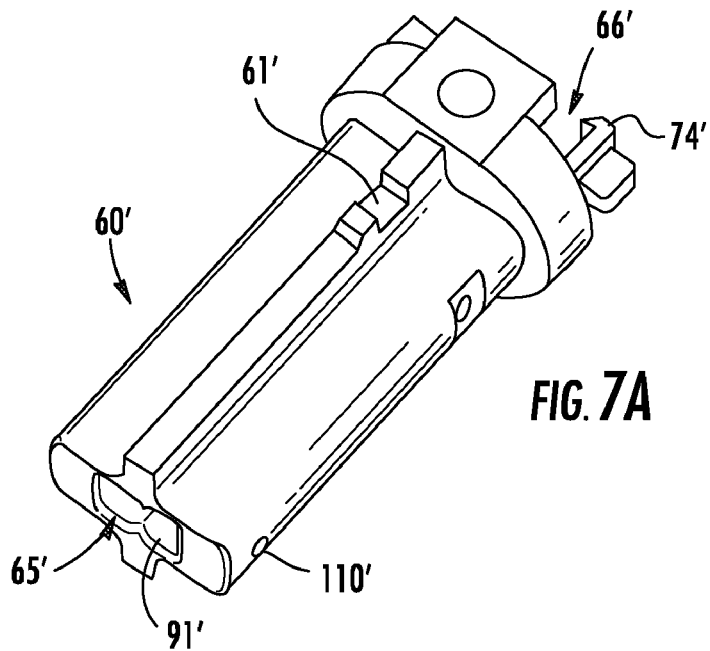
FIGS. 7A and 7B respectively illustrate a rear perspective view of an alternative retention body and a partial cross-sectional view of an assembly using the same.
Figure 7B:
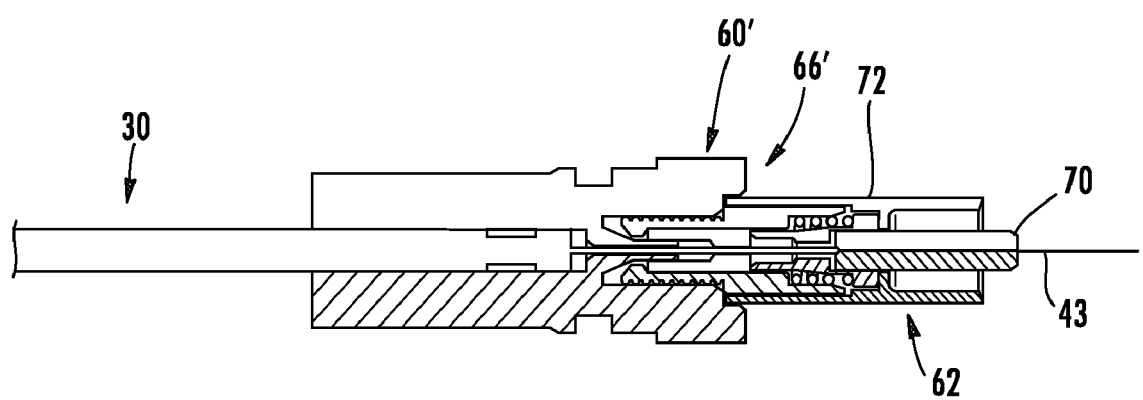

Other variations of the retention body are possible. For instance, FIG. 7A depicts an alternative retention body 60' and FIG. 7B depicts retention body 60' attached to fiber optic cable 30. Retention body 60' is similar to retention body 60 and has a rear end opening 65' that leads to a retention body passage 91' that extends to a front end opening 66'. Retention body 60' also includes interlocking fingers 74 disposed on opposite sides of the same for attaching fiber optic connector sub-assembly 62 thereto as shown in FIG. 7B. Rear end opening 65' generally matches the general exterior profile for receiving the intended fiber optic cable such as fiber optic cable 30. As with retention body 60, after fully inserting fiber optic cable 30 into retention body 60' the bonding agent may be injected through one or more orifices 110' for securing fiber optic cable 30 with the retention body 60'. However, retention body 60' does not include the extended lead-in portion for supporting the fiber optic cable, nor does it include the buckling chamber as discussed below. Other features of the retention body 60' may be the same or similar to those in the retention body 60.

Figure 7C:
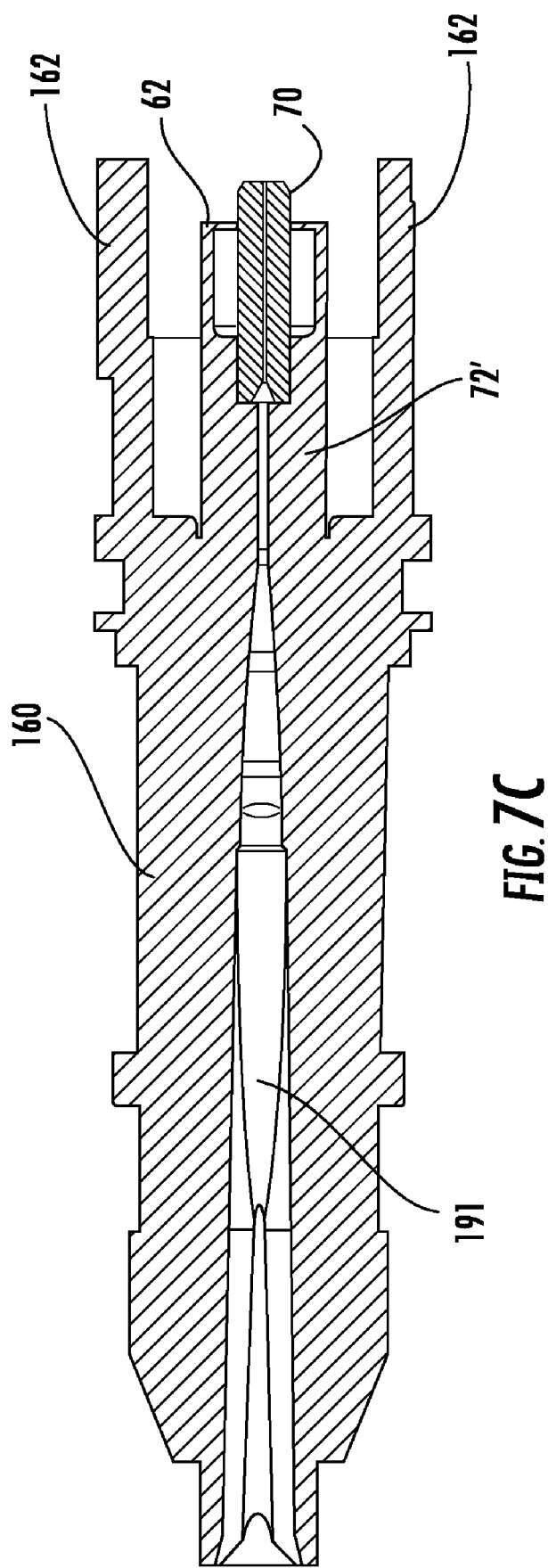
FIG. 7C depicts a cross-sectional view of another retention body having connector mating geometry integrated therewith.

Still other variations of retention bodies are possible such as integrating plug feature into the same. Illustratively, FIG. 7C depicts retention body 160 similar to retention body 60, but which has connector mating geometry and a connector housing 72 integrated as a portion of the same. Other embodiments can have either the connector mating geometry and/or the connector housing integrated with the retention body. Specifically, FIG. 7C depicts a side cross-sectional view of retention body 160 having alignment fingers 162 integrated therewith. Alignment fingers 162 key retention body 160 with a complementary receptacle when making an optical connection. Additionally, retention body 160 includes other geometry on the outer profile that may be similar to the outer profile for a plug housing discussed below. Like retention body 60, retention body 160 has a retention body passage 191 therethrough for receiving the end portion of the fiber optic cable at the rear end and allowing the optical fiber to extend through the opening at the front end. Retention body 160 is also similar to fiber optic assembly 64 in that a fiber optic connector sub-assembly 62 is attaches thereto. As shown, ferrule 70 is fixed with respect to connector housing 72'. In other words, ferrule is not spring loaded, but instead press-fitted into connector housing 72'.

Besides embodiments that include a retention body with integrated mating or fiber optic connector features, retention body embodiments may be formed from more than one-piece. For instance, a retention body can have an end cap portion that attaches to the rear of the retention body. The end cap portion can form one or more functions. For instance, the end cap portion can close and inhibiting leaking of the bonding chamber and/or provide support for the cable where it enters the retention body.

Figure 8:
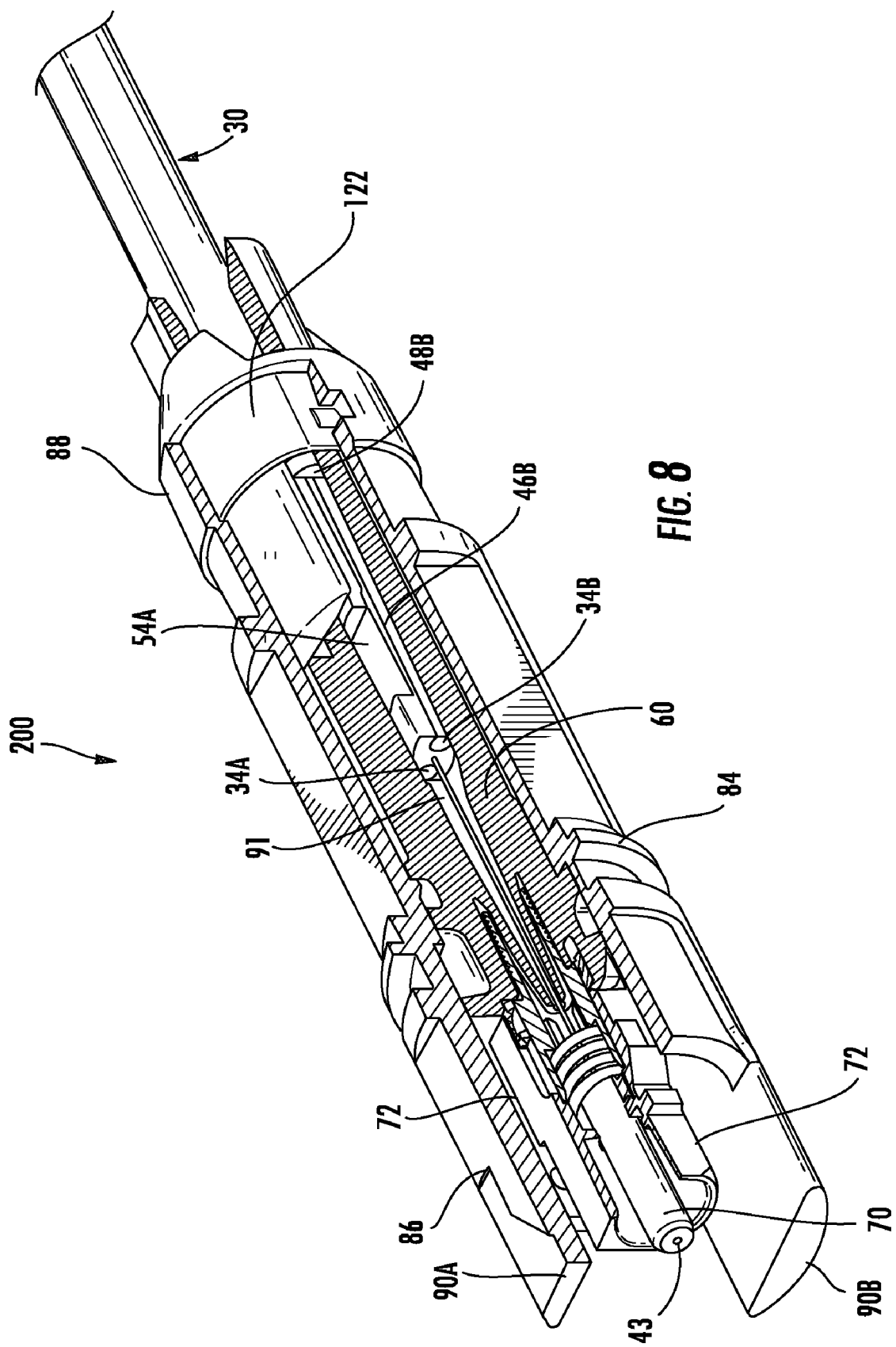
FIG. 8 is a quarter-sectional view of the fiber optic cable assembly of FIGS. 5A and 5B showing the end portion of the fiber optic cable disposed within the retention body.
Figure 9:
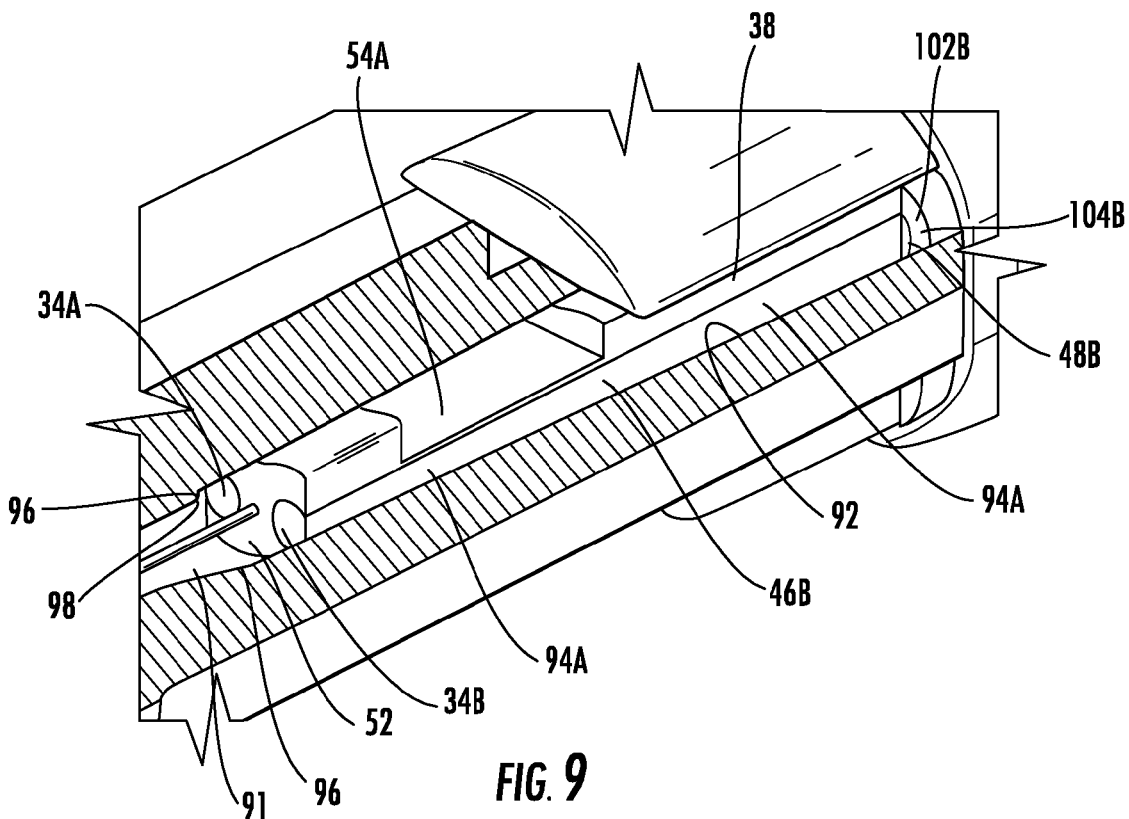
FIG. 9 is a close-up quarter-sectional view of the fiber optic cable assembly of FIGS. 5A and 5B illustrating the cable jacket and at least one partially exposed strength component disposed within the retention body.
Figure 11:
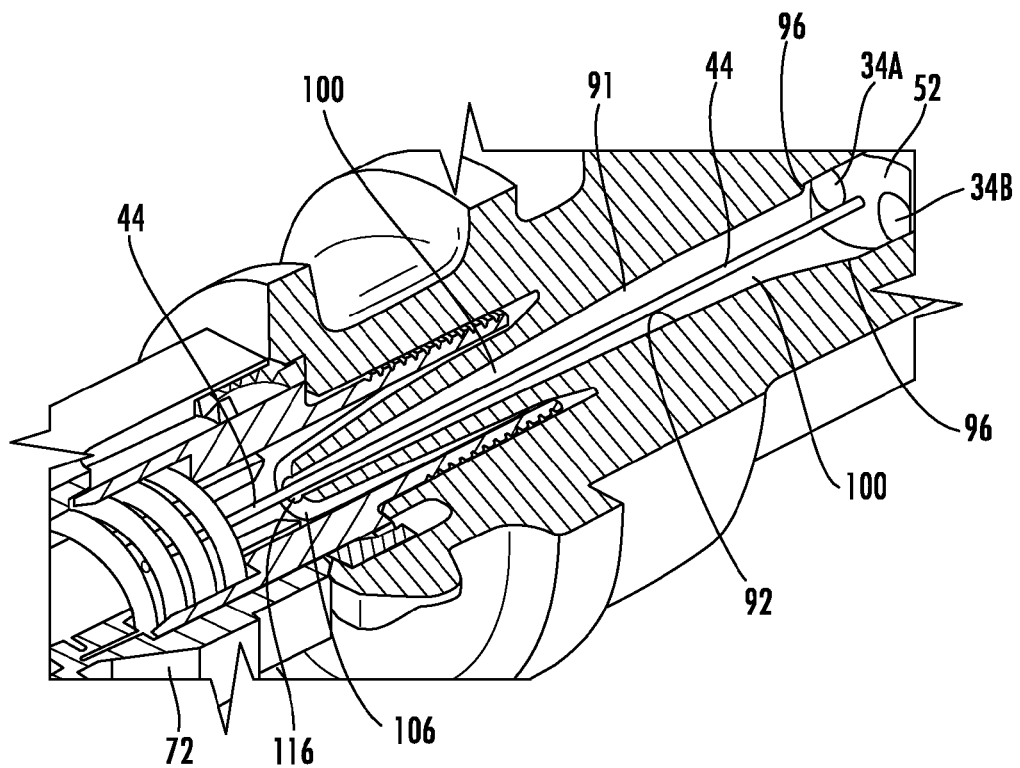
FIG. 11 is a quarter-sectional view of the fiber optic cable assembly of FIGS. 5A and 5B illustrating the optical fiber extending through a buckling chamber of the retention body and into a connector sub-assembly.

FIGS. 8-11 depict further details of the fiber optic assemblies discussed herein. Specifically, FIG. 8 illustrates a sectional view of fiber optic cable assembly 64 as a portion of a larger fiber optic cable assembly 200 with the bonding agent removed for clarity, and FIGS. 9 and 11 depict close-up sectional views of different portions of fiber optic cable assembly 200. FIGS. 10A and 10B respectively illustrate the flow path for the bonding agent of fiber optic cable assembly 64. Fiber optic cable assembly 200 includes retention body 60, fiber optic connector sub-assembly 62, and a plug housing 84 having an end piece 122 that attaches thereto. As illustrated in the quarter-sectional view of FIG. 8, plug housing 84 is substantially hollow and generally receives and protects a portion of fiber optic cable assembly 64 along with fiber optic connector sub-assembly 62. Specifically, plug housing 84 has a generally hollow cylindrical shape with a first end 86 and a second end 88 with a through passageway therebetween. As discussed above, retention body 60 includes flat portions 63 for inhibiting relative rotation between plug housing 84 and retention body 60 when assembled. Retention body also includes locking feature 61 for securing plug housing 84 therewith. Optionally, plug housing 84 may also provide a keying feature (i.e., a keyed passageway to complimentary fit with retention body 60) so that retention body 60 is received therein in one orientation. Plug housing 84 also includes a pair of alignment fingers 90A, 90B having different shapes for mating with a complementary receptacle (not shown) in one orientation.

FIG. 9 illustrates a close-up view of FIG. 8 showing the end portion 42 of the fiber optic cable 30 retained inside the retention body 60 with the bonding agent removed for the purposes of clarity in the illustration. More specifically, interior surface 92 of retention body 60 is designed to fit and interface with the external geometric shape of the end portion 42 of fiber optic cable 30. By way of example, retention body passage 91 has an inner diameter at the rear end opening 65 of retention body 60 that is greater than the end height EH of the end portion 42 so that fiber optic cable 30 may be inserted therein. Moreover, as shown the bonding chamber(s) are formed between retention body 60 and the end portion 42 of the fiber optic cable. In this embodiment, partially exposed portions 46A, 46B of the strength components 34A,34B and cable jacket 38 are secured with retention body 60. Simply stated, the strength components 34A,34B are secured to retention body 60, thereby strain relieving the fiber optic cable so that pulling forces are transferred to the retention body 60. Likewise, FIG. 9 shows one of the optional cross-flow chamber(s) (not numbered) formed between retention body 60 and cross-flow channels 54A and 54B of fiber optic cable 30. Cross-flow channels 54A and 54B allow the bonding agent to flow between bonding chambers 94A, 94B (the bonding chambers on the sides of fiber optic cable 30) and form a stronger bond between retention body 60 and end portion 42 of fiber optic cable 30. Interior surface 92 is formed by the passage of the retention body 60 and along with end portion 42 create flow path(s) for the bonding agent.

Generally speaking, the opening formed by the interior wall 92 gets small as it extends from rear end opening 65 toward the front end opening 66 of the retention body 60 such as by tapering down in size. This change in size inhibits the end portion 42 of fiber optic cable 30 from being over-extended into the retention body passage 91. In other words, the retention body passage 91 acts as a stop so that end portion 42 of the fiber optic cable 30 is inserted the proper amount for aligning the structures. In other words, the front surface 52 of end portion 42 extends into the retention body passage 91 to a point where the inner diameter of the retention body passage 91 becomes smaller in diameter than the size of the front surface 52. This prevents the end portion 42 from being extended through the retention body passage 91 beyond designed limits, but allows the optical fiber 32 to continue extending through the retention body passage 91 and through the front end opening 66 of retention body 60 and into the fiber optic connector sub-assembly 62. Moreover, this abutment blocks the flow of the bonding agent beyond the front surface 52. The tapering of the retention body passage 91 is also designed so that the desired amount of fiber optic cable 30 is inserted into the retention body passage 91 to properly secure the fiber optic cable 30 to the retention body 60.

Interior wall 92 of the retention body 60 also includes the front sealing structure 96. The closing of the front ends of the bonding chambers 94A, 94B inhibits the bonding agent from flowing into a buckling chamber 100 (FIG. 11) defined by the retention body passage 91 adjacent the front end opening 66. Likewise, the retention body passage 91 of the retention body 60 may optionally include a rear shoulder structure for providing one or more rear interior surfaces 104A, 104B for the back sealing locations 48A, 48B to abut against, thereby closing off the rear ends of the bonding chambers 94A, 94B. The rear shoulder structure may not be necessary if the bonding agent has a suitable viscosity to inhibit flowing past any gaps that may exist. Closing off the rear ends of bonding chambers 94A, 94B inhibits the bonding agent from escaping outside of the retention body passage 91 and outside of the fiber optic cable assembly 64. Preferably, the bonding agent does not escape the bonding chambers 94A, 94B, or allow air pockets to form in the bonding chambers 94A, 94B, which could compromise the integrity of the bonding between the fiber optic cable 30 and the retention body 60. The cured bonding agent may also act to close off the bonding chambers 94A, 94B to inhibit the ingress of water or other materials into the structure.

If one or more cross-flow channels are provided, the second orifice 110B can also be used to determine if the bonding chambers 94A, 94B are substantially full. A bonding agent 109 can be injected into the first orifice 110A as illustrated in FIGS. 110A and 110B. As the bonding chamber 94A fills, the bonding agent 109 enters one or both (if provided) cross-flow channels 54A, 54B and flows into the second bonding chamber 94B. When the second bonding chamber 94B is full, the bonding agent 109 can start to flow out of the second orifice 110B. If desired, a sensing device having a sensor with a field of view can be installed proximate the second orifice 110B during assembly to detect when bonding chambers 94A, 94B are filled to the desired level or a predetermined amount of bonding agent can be injected. Second orifice 110B may also allow venting of the air inside the retention body 60, thereby inhibiting air from being trapped within the bonding agent 109, which can compromise the bonding strength. Note that the bonding agent 109 can be injected in either orifice 110A, 110B, and the other orifice 110A, 110B can be used to determine when the bonding chambers 94A, 94B are filled to the desired level.

Figure 10A:
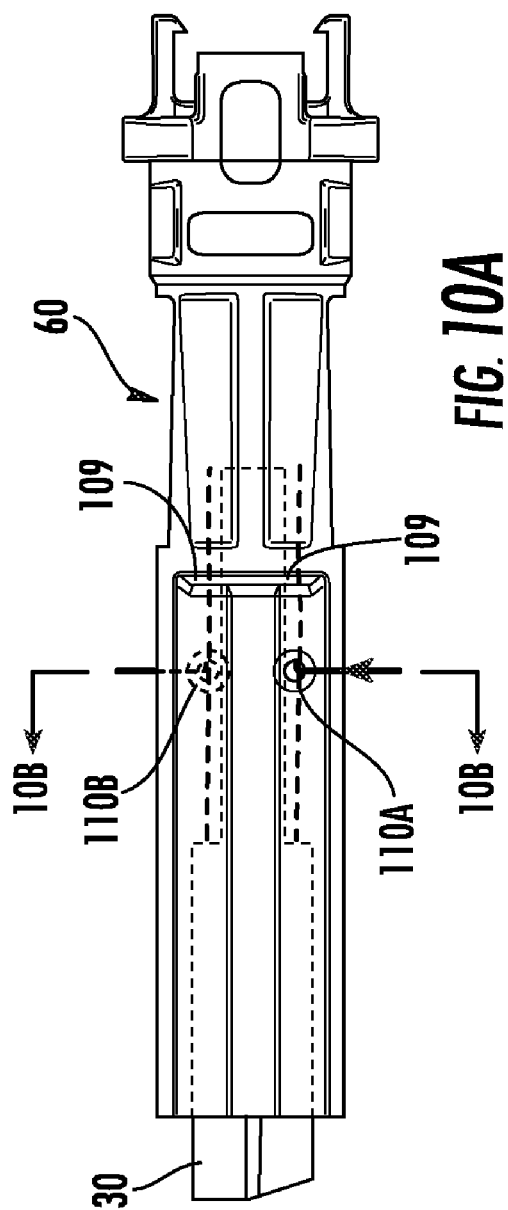
FIGS. 10A and 10B respectively illustrate a plan view and a cross-sectional view of the fiber optic cable assembly of FIG. 5B, which schematically illustrates the flow path for the bonding agent.
Figure 10B:
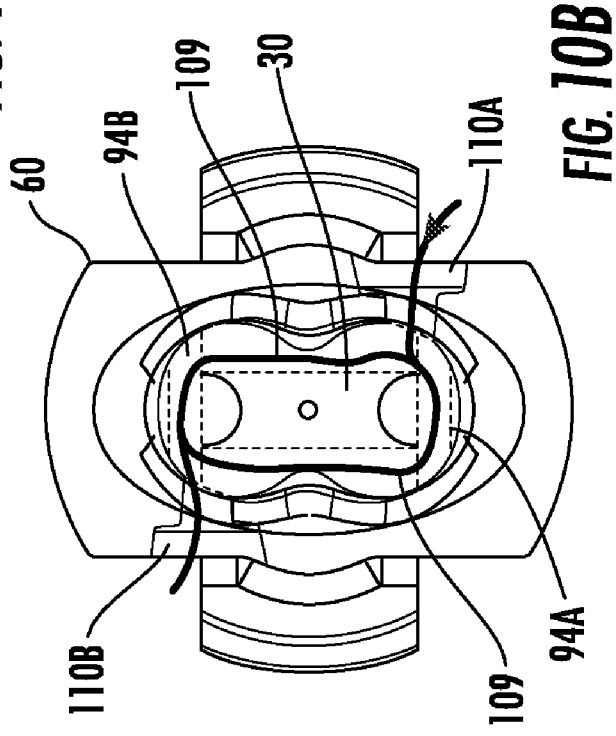

FIGS. 10A and 10B respectively illustrate a plan view and a cross-sectional view that schematically depicts the flow path of bonding agent 109 within retention body 60 when fiber optic cable 30 is fully inserted therein. Specifically, FIGS. 10A and 10B show the flow path of the bonding agent into and around bonding chambers 94A, 94B (not visible) and cross-flow chambers (not numbered). More specifically, FIG. 10A shows the flow path of bonding agent 109 into orifice 110A represented by arrow pointing into the same. As shown by the dashed line in FIG. 10A, bonding agent 109 enters the retention body 60 and can move forward and backwards into the respective bonding chamber. Moreover, as shown by the thick solid line in FIG. 10B, in addition to flowing forward and backward bonding agent 109 can flow about fiber optic cable 30 into the cross-flow chambers and into the bonding chamber on the other side of fiber optic cable 30. Moreover, air can escape out of orifice 110B as the bonding agent is injected into orifice 110A.

FIG. 11 illustrates a close-up view of FIG. 8 showing front sealing location 52 of the end portion 42 abutted against front sealing structure 96. Thus, the front surface 52 of the end portion 42 does not extend beyond the front sealing structure 96. Any bonding agent injected into the bonding chambers 94A, 94B is prevented from flowing beyond front surface 52. However, the bare and coated portions 43, 44 of the optical fiber 32, being smaller in diameter than the inner diameter of the retention body passage 91, extend through the retention body passage 91 and through the front end opening 66 of the retention body 60 for insertion into the ferrule holder 68 of the fiber optic connector sub-assembly 62. Also, as shown cone 106 extends into a portion of fiber optic connector sub-assembly 62. Interior wall 92 of retention body 60 is shaped such that the retention body passage 91 tapers down in size within cone 106 and extends through the front end orifice 116 of the retention body 60. In other words, retention body passage 91 extends into cone 106 and through the front end opening 66 of the same. By way of example, cone 106 may have a length of about 14-15 millimeters (mm), but other suitable dimensions are possible if the structure is used. Cone 106 also provides an alignment or centering feature for the optical fiber 32 as it is extended therethrough so that the optical fiber 32 exits the retention body 60 at a defined location for alignment with fiber optic connector sub-assembly 62. For example, the inner diameter of the retention body passage 91 at the front end opening 66 is about 500 micrometers (μm), but other suitable sizes are possible such as 250 or 700 micrometers so long as it allows optical fiber 32 to pass therethrough. Simply stated, retention body passage 91 disposed forward of front shoulder structure 96 of this embodiment has an inner diameter that is larger than optical fiber 32, thereby creating a buckling chamber 100.

Buckling chamber 100 is disposed within a forward portion of retention body 60 and provides space for optical fiber 32 to move (i.e., shift, bend, or the like) in case the optical ferrule 70 retracts and pushes the optical fiber 32 back into retention body passage 91 (i.e., accommodates longitudinal movement). Buckling chamber 100 may be provided in the retention body independent of the securing method between the retention body and the fiber optic cable. By way of explanation, buckling chamber 100 accommodates the backward movement of ferrule 70 since it is spring loaded within the fiber optic connector sub-assembly 62, which pushes optical fiber 32 backwards as much as 0.5 millimeters (mm). Moreover, buckling chamber 100 is not filled with the bonding agent so that optical fiber 32 can move and/or bend, thereby inhibiting optical attenuation since it can not move backward into fiber optic cable 30. In other words, the design of fiber optic cable 30 does not allow longitudinal movement of optical fiber 32 into fiber optic cable 30. Without buckling chamber 100, movement of ferrule 70 may cause optical fiber 32 to break as opposed to bend and/or have elevated levels of optical attenuation. Generally speaking, buckling chamber 100 has a reduced size (i.e., the bucking chamber converges) moving toward the front for providing an alignment feature for guiding (i.e., centering) the optical fiber as it is inserted into the retention body and/or fiber optic connector sub-assembly. Thus, providing a buckling chamber 100 in a retention body may be desired regardless of the type of fiber optic cable used (i.e., whether or not the optical fiber can move longitudinally), whether the retention body 60 is secured to the strength components 34A, 34B, the ferrule is fixed or spring loaded, and/or the like.

Fiber optic cables can be preconnectorized in the field or the factory on one or more ends with a fiber optic connector such as a hardened fiber optic connector, thereby making a preconnectorized fiber optic cable or assembly suitable for plug and play connectivity by the craft. As used herein, a hardened connector refers to a robust fiber optic connector that is weatherproof, thereby making it suitable for use in the outside plant environment, but it is possible to use the hardened connector indoors. For instance, the craft may route the preconnectorized fiber optic cable having the hardened connector to a premises, a multi-port device, a network interface device (NID), an optical network terminal (ONT), a closure, or the like.

Figure 12A:
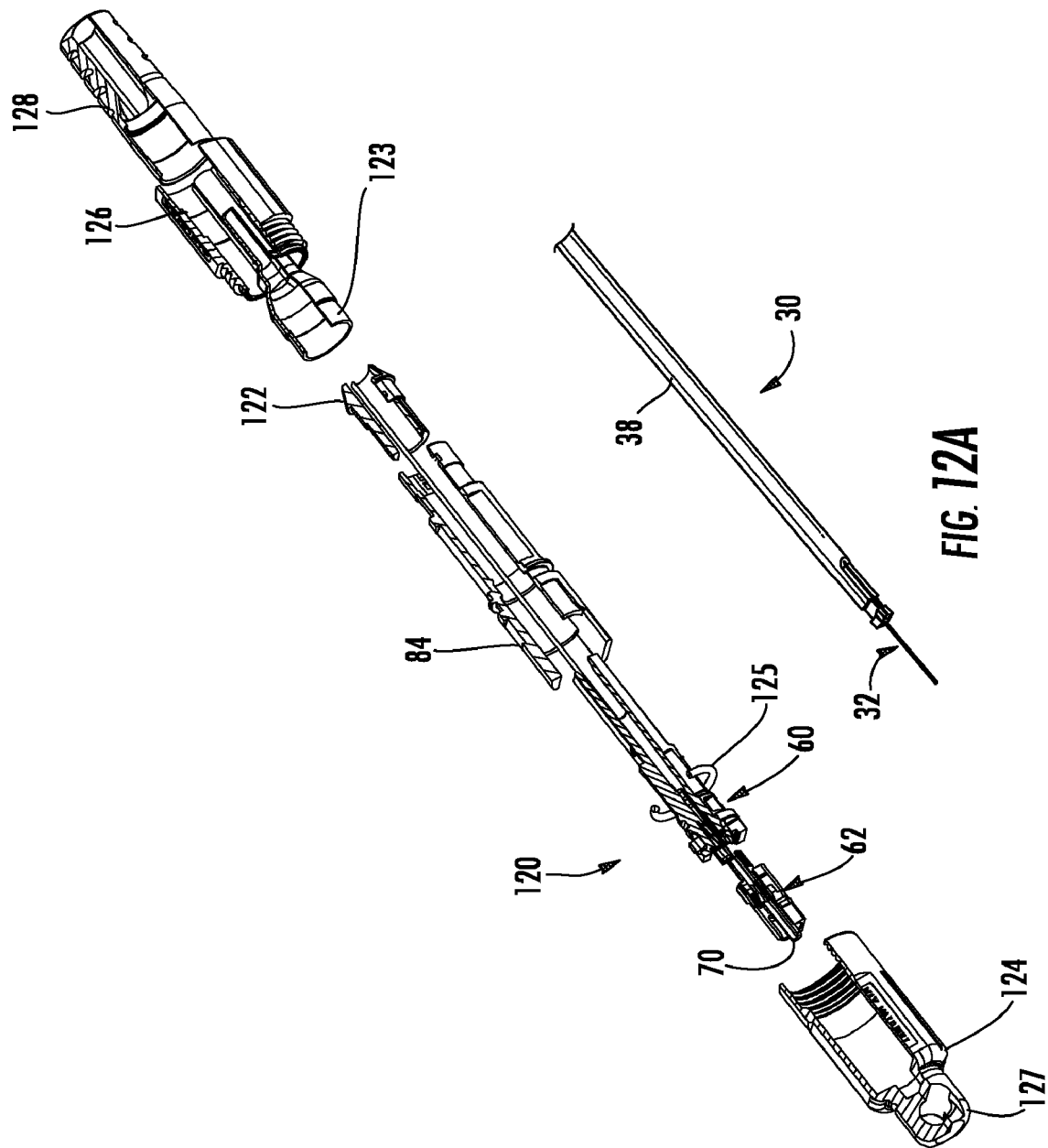
FIGS. 12A and 12B respectively illustrate a partially exploded, partial sectional view along with an assembled side view of the fiber optic cable assembly of FIGS. 5A and 5B provided as part of a hardened fiber optic connector.
Figure 12B:
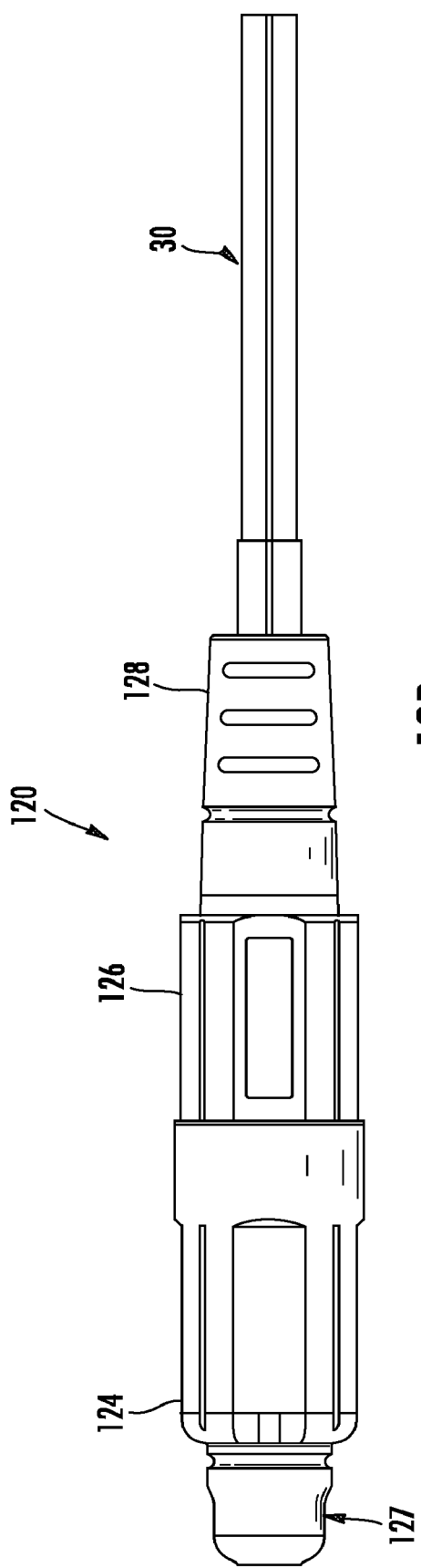

FIGS. 12A and 12B respectively illustrate an exploded and assembled view of fiber optic cable assembly 64 as part of an explanatory hardened fiber optic connector assembly 120. Hardened fiber optic connector assembly 120 includes plug housing 84 that receives a portion of fiber optic cable assembly 64 therein. Fiber optic connector 120 further includes end piece 122, a heat shrink 123, a protective cap 124, one or more O-rings 125, a coupling nut 126, and a boot 128. Protective cap 124 is provided that is configured to be placed about the fiber optic connector sub-assembly 64 for protecting ferrule 70. Protective cap 124 is configured to theadly engage a coupling nut 126 that fits over plug housing 84 and that can rotate thereabout. Coupling nut 126 is also used for mating fiber optic connector 120 with a complementary receptacle (not shown). One or more silicone O-rings 125 are disposed on plug housing 84 to environmentally seal the protective cap 124 to the plug housing 84 and/or with the complementary receptacle. Protective cap 124 may also incorporate an integral pulling eye 127 for pulling the assembly during installation and the like. Heat shrink 123 fits over a portion of plug housing 84 and a portion of fiber optic cable 30 for sealing the interface therebetween. Boot 128 supports fiber optic cable 30 to inhibit and/or reduce sharp bending of the fiber optic cable 30 near an end of the fiber optic connector 120. Fiber optic connector 120 may also include a lanyard (not shown) for attaching protective cap 124 to the same. Moreover, the retention body may be used as a kit of parts for field or factory use that further includes one or more parts of hardened fiber optic connector assembly 120 or other suitable fiber optic connectors.

Hardened fiber optic connector 120 is depicted with a SC type of fiber optic connector sub-assembly 62. However, other types of connector assemblies, such as LC, FC, ST, MT, and MT-RJ, are also contemplated with the concepts of the disclosure. Thus, suitable fiber optic cables may be used with any suitable retention body and/or fiber optic connector sub-assembly, thereby resulting in numerous fiber optic assembly combinations.

Additionally, other methods of securing the retention body to the fiber optic cable are possible, thereby making it versatile. These other methods may be employed in lieu of or in addition to using the bonding agent. For example, FIGS. 13A and 13B illustrate perspective views of the retention body 60 employing different mechanical elements for securing the end portion of the fiber optic cable 130 thereto. Specifically, FIG. 13A illustrates a crimp band 140 and FIG. 13B illustrates a mechanical element 141 that penetrates the fiber optic cable for securing retention body 60 with fiber optic cable 30. Crimp band 140 has a forward portion that is crimped to the rear portion of retention body 60 and a rear portion that is crimped to fiber optic cable 130. Crimp band 140 is preferably made from brass, but other suitable crimpable materials are possible. Conversely, mechanical element 141 fits entirely over retention body 60 and is punched so that fingers 141a extend into the strength components of fiber optic cable 30, thereby securing the same. Additionally, retention body 60 may include one or more windows at the top and bottom that align with the placement of mechanical element 141 so that fingers 141a do not have to pierce retention body 60. Further, if a mechanical element is employed the retention body should be robust enough to withstand the crimping and maintain the desired level of attachment.

Figure 14:
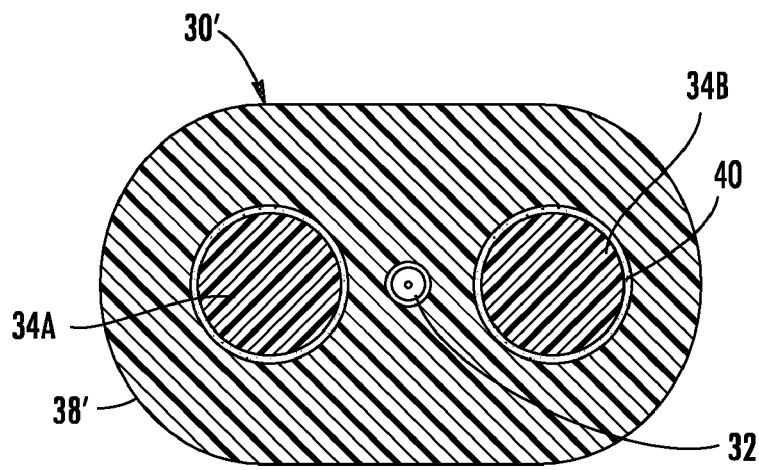
FIG. 14 is a cross-sectional view of an alternate fiber optic cable including a buffer tube that may be employed in the fiber optic cable assembly.
Figure 15:
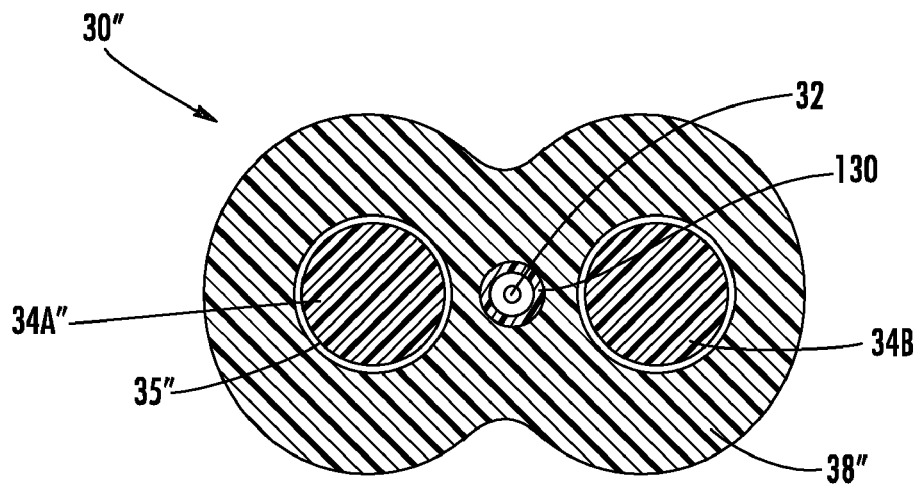
FIG. 15 is a cross-sectional view of another alternate fiber optic cable that may be employed in the fiber optic cable assembly.
Figure 16:
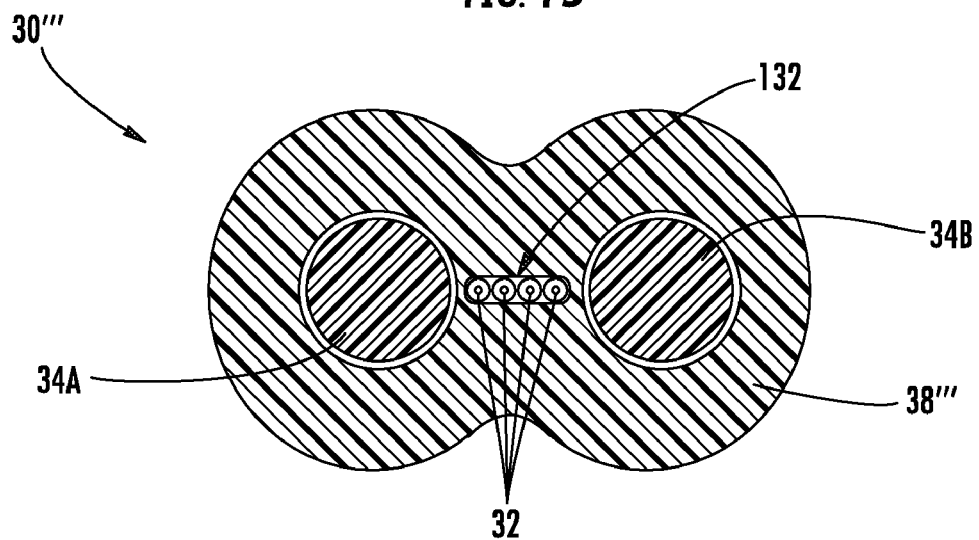
FIG. 16 is a cross-sectional view of still another multi-fiber optic cable that may be employed.

Additionally, fiber optic cable designs according to the concepts of the disclosure can have any suitable number of optical fibers in any suitable configuration such as bare, colored, coated, or ribbonized format. For example, FIG. 14 is a cross-sectional view of a fiber optic cable 30' similar to that of FIG. 2, except that the indentations 39A, 39B in the cable jacket 38 are not included. In other words, cable jacket 38' has a flat profile. FIG. 15 is a cross-sectional view of a fiber optic cable 30" similar to that of FIG. 2, except optical fiber 32 is housed with a buffer tube 130. FIG. 16 illustrates a cross-sectional view of a fiber optic cable 30''' having a plurality of optical fibers 32. Specifically, four optical fibers 32 are disposed in an optical fiber ribbon 132, but other fiber counts are possible. Other fiber optic cable designs and/or cable strip preparation are also possible with the concepts disclosed herein.

By way of example, FIG. 17 depicts a perspective view of an explanatory fiber optic cable 330 having an end portion prepared for insertion to a suitable retention body. Specifically, fiber optic cable 330 is the same as fiber optic cable 30, except that an end portion 342 is prepared in a different manner as shown. End portion 342 is formed in multiple steps and partially exposes and/or shaves a portion of first and second strength components 34A, 34B. By way of example, end portion 342 is formed by first cutting the sides of fiber optic cable 330 by starting the cut at the appropriate angle for creating back sealing locations 348A,348B (not visible) on opposing sides and then cutting longitudinally forward along the fiber optic cable. Next, the top and bottom surfaces are cut starting at the cable seating locations (not numbered) which also help define the cross-flow chambers when inserted into a suitable retention body and cutting longitudinally forward along the fiber optic cable. By way of example, an appropriate angle for starting the cuts is about 30 degrees, but other angles are possible for cooperating with a suitable retention body. After cutting the sides, top, and bottom, a rectangular section forward of the front sealing locations remains that has a height that is about the same as the strength components. The rectangular section includes the strength components 34A, 34B, the optical fiber 32 and the remaining portion of the cable jacket that all extend to the front surface of the end portion. Next, strength components 34A, 34B are cut back to the desired length from the rectangular section. Strength components 34A, 34B may be slightly separated from the remaining portion of the cable jacket during the cutting of the same such as by pushing down the remaining portion of the cable jacket between the strength components. Thus, the optical fiber 32 and the remaining portion of the cable jacket are the only structure remaining forward of the cut strength components 34A, 34B. Finally, the remaining portion of the cable jacket forward of the cut strength components 34A, 34B is removed, but small remnants of the cable jacket may remain so long as it does not materially affect performance. This end portion preparation method is advantageous since it reduces the risk of damage to the optical fiber during the preparation process by reducing stress and/or strain experience by the optical fiber. In other words, a great deal of the cable jacket is removed before the remaining portion of the cable jacket disposed about the optical fiber is removed, thereby reducing forces on the optical fiber. Fiber optic cable 330 may be used in any suitable retention body or the like.

Figure 18:
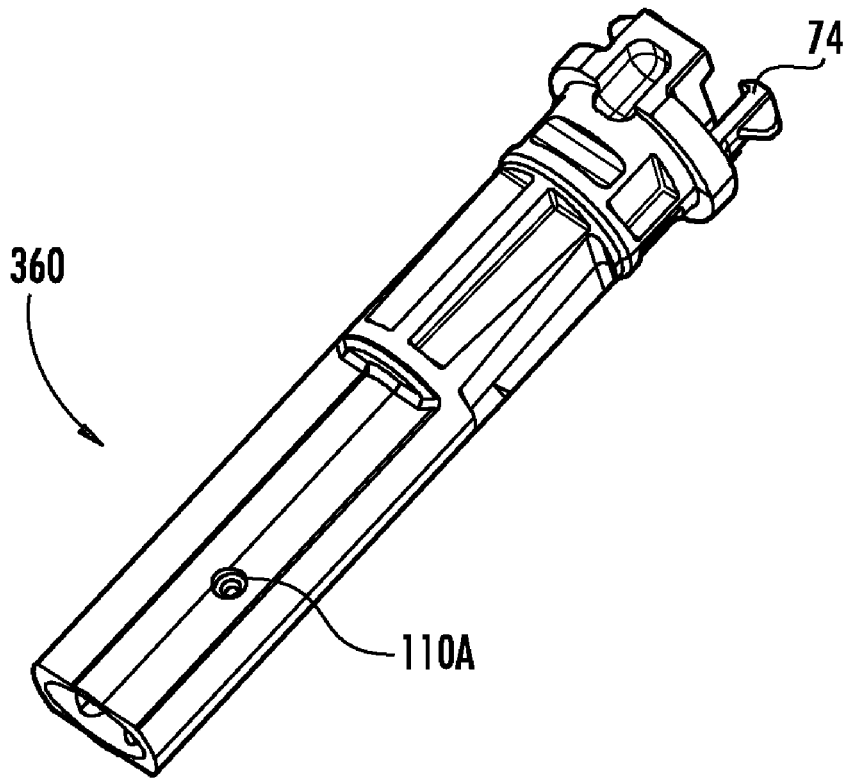
FIGS. 18 and 19 are perspective views of another explanatory retention body suitable for securing the fiber optic cable of FIG. 17.
Figure 19:
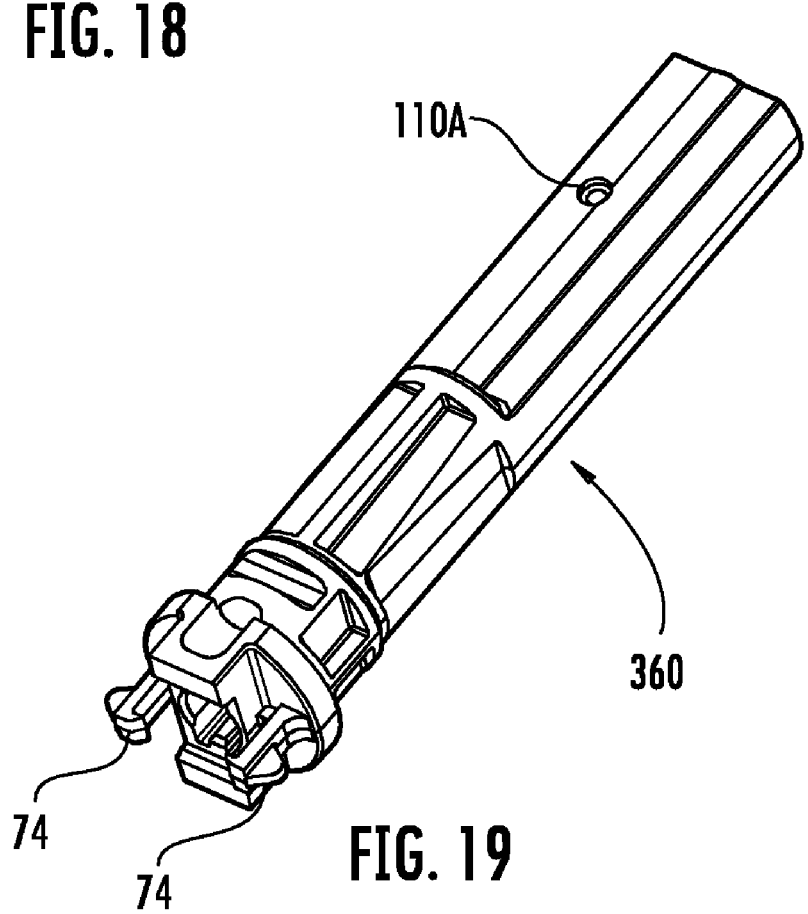

Illustratively, FIGS. 18 and 19 are perspective views of an explanatory retention body 360 suitable for securing the fiber optic cable 330 thereto. Retention body 360 is similar to retention body 60, but different in some regards. Retention body 360 receives a suitably prepared cable and fiber optic connector sub-assembly 62 for forming a fiber optic cable assembly 364 such as shown in FIGS. 20 and 21 that is similar to fiber optic cable assembly 64. Retention body 360 includes one or more orifices such as orifice 110A for injecting a bonding agent into the retention body (or venting for the bonding agent) for securing fiber optic cable 330. Additionally, orifice 110A is shifted farther back on retention body 360 compared with retention body 60. Likewise, bonding chamber (not numbered) and the buckling chamber 100 of retention body 360 are shifted farther back as shown in FIGS. 20 and 21, but buckling chamber 100 is still disposed within a forward portion of retention body 360. During assembly, fiber optic connector sub-assembly 62 is attached to retention body 360, thereby forming fiber optic cable assembly 364. Fiber optic connector sub-assembly 62 is attached to retention body 360 by snap-fitting with interlocking fingers 74 disposed on opposite sides of retention body 60 or in another suitable manner. As shown, interlocking fingers 74 are configured for latching into recessions 76 formed into and on opposite sides of the connector housing 72 of fiber optic connector sub-assembly 62. Additionally, fiber optic cable assembly 364 may be modified for plug and play use as a fiber optic connector by adding a securing feature for the same.

Figure 22:
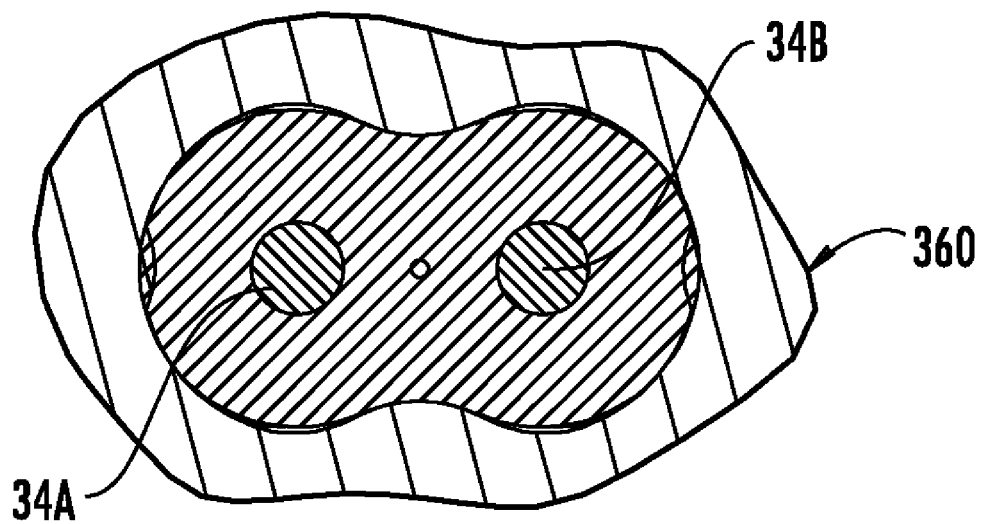
FIGS. 22 and 23 are respective transverse cross-sectional view taken along lines 22-22 and lines 23-23 showing the fiber optic cable within the retention body.
Figure 23:
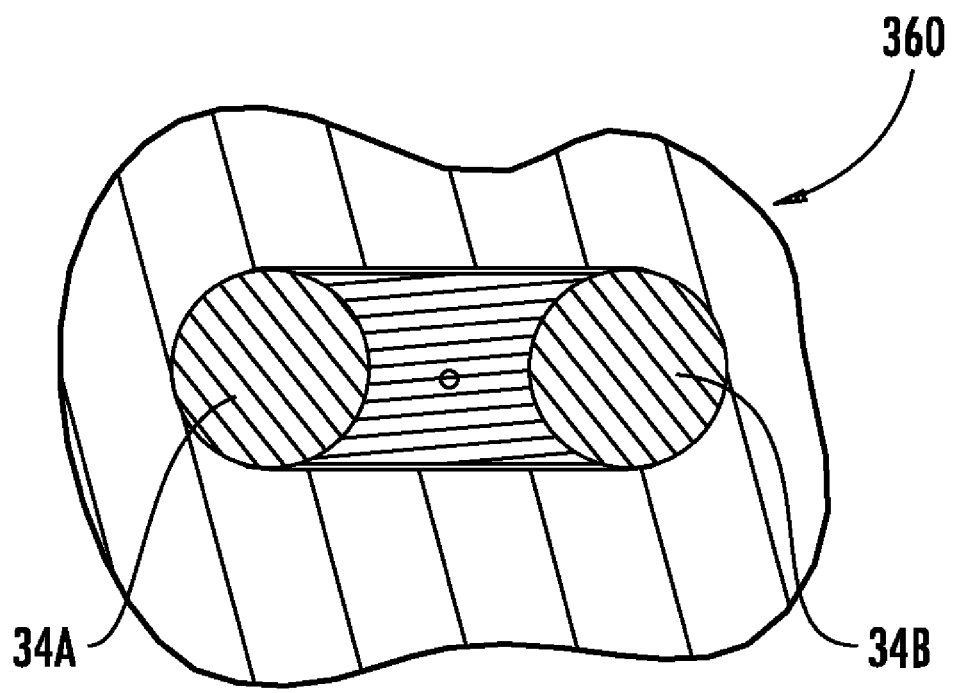

FIGS. 20 and 21 are respective cross-sectional views of fiber optic cable assembly 364 including retention body 360 with fiber optic cable 330 and fiber optic sub-assembly attached thereto with the bonding agent removed for clarity. As best shown in FIG. 21, fiber optic cable 330 is inserted into retention body 360 until it is fully seated therein by the interference between fiber optic cable 330 and retention body 360 and optical fiber 32 is inserted into the ferrule 70. The rear body of the fiber optic connector sub-assembly 62 may include one or more centering features 63 for guiding and supporting the optical fiber therein. Specifically, cable seating locations 349 on the top and bottom of the fiber optic cable 330 interfere with a sidewall of the passage (not numbered) of retention body 360. Back sealing locations 348A,348B of fiber optic cable 330 close off the rear portion of retention body 360 so that the bonding agent is inhibited from escaping at the rear of same. As shown in FIG. 21, the height of the passage through retention body 360 changes, thereby forming a front sealing portion with the rectangular portion of the cable so that the bonding agent is inhibited from escaping into the front of retention body 360. FIGS. 22 and 23 are respective transverse cross-sectional views taken along lines 22-22 and lines 23-23 of FIG. 20 showing fiber optic cable 360 within the retention body. Generally speaking, the bonding chamber(s) of fiber optic cable assembly 364 is essentially formed between the cross-section of FIG. 22 and FIG. 23. As shown, this embodiment has a smaller bonding chamber and uses less bonding agent than the other embodiments, while still providing a similar level of retention.

Retention body 360 includes buckling chamber 100 disposed within a forward portion of the retention body, thereby accommodating movement of optical fiber 32. Specifically, buckling chamber 100 is disposed between the front surface of fiber optic cable 330 and neck-down portion 105 of retention body 360. Retention body 360 also includes a front end suitable for receiving fiber optic connector sub-assembly 62. Retention body 360 also includes features that interface with other components of a connector such as the locking feature and alignment features. Variations of retention body 360 are also possible.

Figure 24:
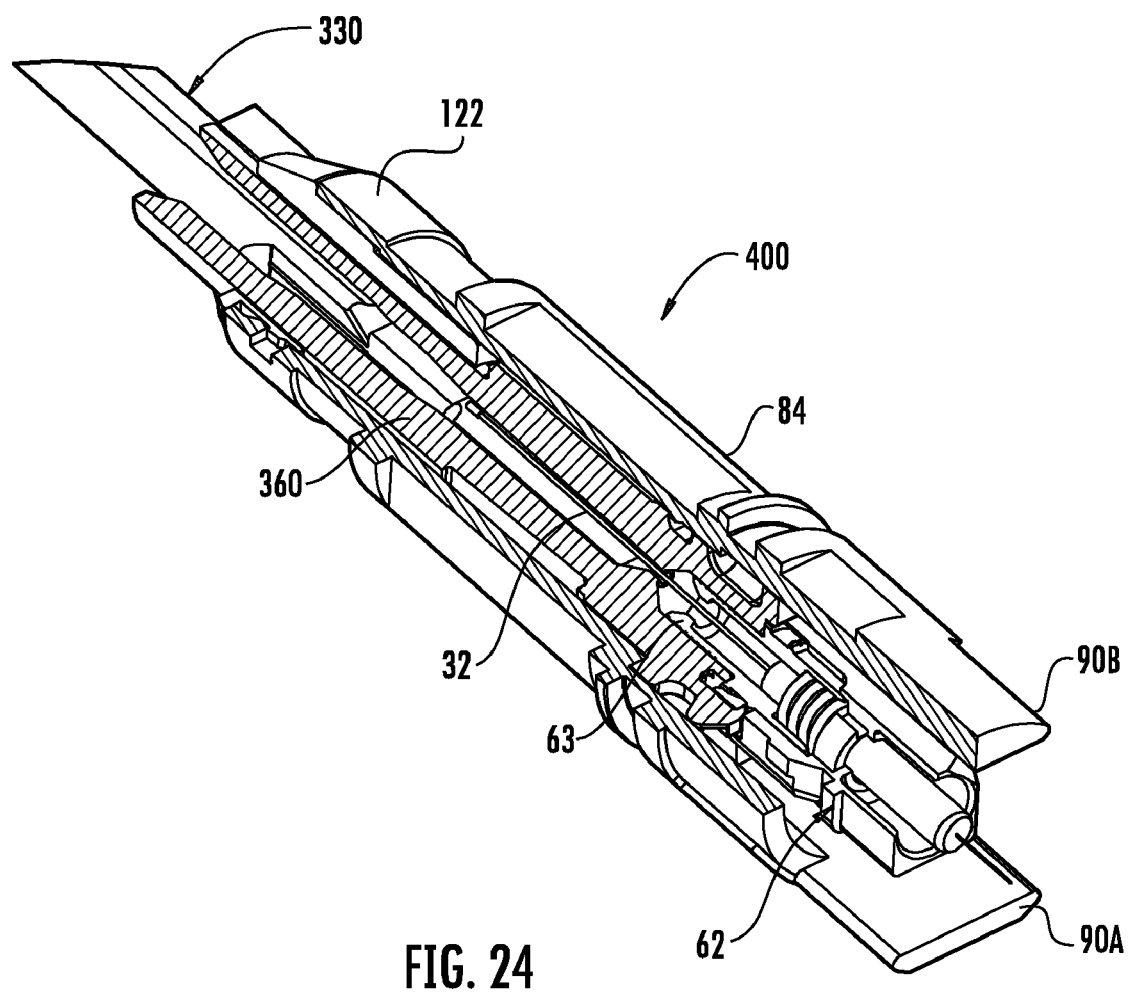
FIG. 24 is a quarter-sectional view of the fiber optic cable assembly showing the end portion of the fiber optic cable of FIG. 17 disposed within the retention body of FIGS. 18 and 19.

FIG. 24 depicts a quarter-sectional view of the fiber optic cable assembly 364 forming a portion of a larger fiber optic cable assembly 400. Fiber optic cable assembly 400 includes fiber optic cable assembly 364 disposed within plug housing 84 having an end piece 122 that attaches thereto, but the plug housing may be one-piece. As discussed above, retention body 360 includes flat portions (not numbered) for inhibiting relative rotation between plug housing 84 and retention body 360 when assembled. Retention body 360 also includes locking feature (not numbered) for securing plug housing 84 therewith. Plug housing 84 has a pair of alignment fingers 90A, 90B with different shapes for mating with a complementary receptacle (not shown) in one orientation. Fiber optic cable assembly 400 can also include other components such as a coupling nut, heat shrink, one or more o-rings, cap, or other suitable components. Other embodiments of fiber optic cable assemblies are also possible such as having the retention body form a portion of the fiber optic connector such as by having the connector housing integrally formed with the retention body. Likewise, the alignment fingers and/or portions of the plug housing may be integral with the retention body.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A retention body for securing a fiber optic cable and a fiber optic connector assembly, the retention body comprising:
a passage extending through the retention body and defining a front end opening and a rear end opening on opposites ends of the retention body, the passage being defined by an interior wall that tapers along at least a portion of the length of the passage, wherein an end portion of a fiber optic cable fits with an interference fit against the interior wall in at least two locations to define a buckling chamber and at least one bonding chamber, the end portion of the fiber optic cable having a portion of a cable jacket removed and a portion of a strength element removed, the buckling chamber being disposed closer to the front end opening and the at least one bonding chamber being disposed closer to the rear end opening, the bonding chamber including a first orifice for injecting a bonding agent into the bonding chamber, the buckling chamber not receiving the bonding agent.

2. The retention body of claim 1, the buckling chamber facilitating insertion and centering of at least one optical fiber through the front end opening.

3. The retention body of claim 1, the front end opening being smaller than the rear end opening.

4. The retention body of claim 1, the buckling chamber converging from the rear end opening to the front end opening.

5. The retention body of claim 4, the fiber optic cable being secured with the bonding agent.

6. The retention body of claim 1, the retention body including at least one locking feature and at least one alignment feature.

7. The retention body of claim 1, the retention body forming a portion of a fiber optic connector.

8. The retention body of claim 1, the retention body including connector mating geometry.

9. The retention body of claim 1, the retention body having one or more interlocking fingers for attaching a fiber optic connector sub-assembly.

10. The retention body of claim 1, the retention body comprising a portion of a kit of parts that further includes a fiber optic connector sub-assembly, a plug housing, and a coupling nut.

11. A retention body for securing a fiber optic cable and a fiber optic connector assembly, the retention body comprising:
a passage extending through the retention body and defining a front end opening and a rear end opening on opposites ends of the retention body, the passage being defined by an interior wall that tapers along at least a portion of the length of the passage, wherein an end portion of a fiber optic cable fits with an interference fit against the interior wall in at least two locations to define a buckling chamber and at least one bonding chamber, the end portion of the fiber optic cable having a portion of a cable jacket removed and a portion of a strength element removed, the buckling chamber being disposed closer to the front end opening and the at least one bonding chamber being disposed closer to the rear end opening, the bonding chamber including a first orifice for injecting a bonding agent into the bonding chamber, the buckling chamber not receiving the bonding agent, the buckling chamber not receiving the bonding agent; and
at least two interlocking fingers on a front end of the retention body for securing the fiber optic connector sub-assembly.

12. The retention body of claim 11, wherein the buckling chamber is disposed rearward of a neckdown portion of the retention body.

13. The retention body of claim 11, wherein the buckling chamber facilitates insertion and centering of at least one optical fiber through the front end opening.

14. The retention body of claim 11, wherein the front end opening is smaller than the rear end opening.

15. The retention body of claim 11, wherein the buckling chamber converges from the rear end opening to the front end opening.

16. The retention body of claim 11, further including at least one locking feature and at least one alignment features.

17. The retention body of claim 11, wherein the retention body forms a portion of a fiber optic cable assembly.

18. The retention body of claim 11, wherein the retention body includes connector mating geometry.

19. The retention body of claim 11, wherein the retention body is a portion of a kit of parts that further includes a fiber optic connector sub-assembly, a plug housing, and a coupling nut.

* * * * *